(12) United States Patent
Arnott et al.

(10) Patent No.: US 7,620,577 B2
(45) Date of Patent: Nov. 17, 2009

(54) NON-CAPITALIZATION WEIGHTED INDEXING SYSTEM, METHOD AND COMPUTER PROGRAM PRODUCT

(75) Inventors: Robert D. Arnott, Pasadena, CA (US); Paul Christopher Wood, Waltham (GB)

(73) Assignee: Research Affiliates, LLC, Newport Beach, CA (US)

(*) Notice: Subject to any disclaimer, the term of this patent is extended or adjusted under 35 U.S.C. 154(b) by 312 days.

(21) Appl. No.: 11/196,509

(22) Filed: Aug. 4, 2005

(65) Prior Publication Data

US 2006/0015433 A1 Jan. 19, 2006

Related U.S. Application Data

(63) Continuation-in-part of application No. 10/961,404, filed on Oct. 12, 2004, and a continuation-in-part of application No. 10/159,610, filed on Jun. 3, 2002.

(60) Provisional application No. 60/541,733, filed on Feb. 4, 2004.

(51) Int. Cl.
G06Q 40/00 (2006.01)

(52) U.S. Cl. .................... 705/35; 705/36 R; 705/37

(58) Field of Classification Search .................. 705/35, 705/36

See application file for complete search history.

(56) References Cited

U.S. PATENT DOCUMENTS 4,334,270 A   6/1982   Towers (Continued)

FOREIGN PATENT DOCUMENTS

EP   1351179 A1   10/2003

(Continued)

OTHER PUBLICATIONS

John D. Bazley, Financial Accounting Concepts and Uses, PWS-Kent Publishing Company, 1988, p. 4.*

(Continued)

*Primary Examiner*—Alexander Kalinowski
*Assistant Examiner*—Gregory Johnson
(74) *Attorney, Agent, or Firm*—Venable LLP; Ralph P. Albrecht; Cameron H. Tousi

(57) ABSTRACT

A passive investment system based on indices created from various metrics is disclosed. The indexes may be built with metrics other than market capitalization weighting, price weighting or equal weighting. These metrics may include, but are not limited to book value, sales, revenue, earnings, earnings per share, income, income growth rate, dividends, dividends per share, earnings before interest, tax, depreciation and amortization, etc. Non-financial metrics may also be used to build indexes to create passive investment systems. Additionally, a combination of financial non-market capitalization metrics may be used along with non-financial metrics to create passive investment systems. Once the index is built, it may be used as a basis to purchase securities for a portfolio. As the data underlying the indexes changes because of, e.g., economic activity, the index may be updated and may be used as a basis to rebalance the portfolio. Alternatively, the index can be rebalanced when a pre-determined threshold is reached. Specifically excluded are widely-used capitalization-weighted indexes and price-weighted indexes, in which the price of a security contributes in a substantial way to the calculation of the weight of that security in the index or the portfolio. Valuation indifferent indexes of the present invention avoid overexposure to overvalued securities and underexposure to undervalued securities, as compared with conventional capitalization-weighted and price-weighted. Also specifically excluded are equal weighting weighted indexes.

33 Claims, 3 Drawing Sheets

U.S. PATENT DOCUMENTS

| | | |
|---|---|---|
| 4,933,842 A | 6/1990 | Durbin et al. |
| 5,101,353 A | 3/1992 | Lupien et al. |
| 5,126,936 A | 6/1992 | Champion et al. |
| 5,132,899 A | 7/1992 | Fox |
| 5,193,056 A | 3/1993 | Boes |
| 5,592,379 A | 1/1997 | Finfrock et al. |
| 5,644,727 A | 7/1997 | Atkins |
| 5,745,706 A | 4/1998 | Wolfberg et al. |
| 5,761,442 A * | 6/1998 | Barr et al. .................. 705/36 R |
| 5,812,987 A | 9/1998 | Luskin et al. |
| 5,819,238 A * | 10/1998 | Fernholz .................... 705/36 R |
| 5,875,437 A | 2/1999 | Atkins |
| 5,878,405 A | 3/1999 | Grant et al. |
| 5,911,135 A | 6/1999 | Atkins |
| 5,926,792 A | 7/1999 | Koppes et al. |
| 5,946,666 A | 8/1999 | Nevo et al. |
| 5,946,667 A | 8/1999 | Tull, Jr. et al. |
| 5,978,778 A | 11/1999 | O'Shaughnessy |
| 6,003,018 A | 12/1999 | Michaud et al. |
| 6,061,663 A | 5/2000 | Bloom et al. |
| 6,064,985 A | 5/2000 | Anderson |
| 6,073,116 A | 6/2000 | Boyle |
| 6,088,685 A | 7/2000 | Kiron et al. |
| 6,092,056 A | 7/2000 | Tull, Jr. et al. |
| 6,134,535 A | 10/2000 | Belzberg et al. |
| 6,161,098 A | 12/2000 | Wallman |
| 6,175,824 B1 | 1/2001 | Breitzman et al. |
| 6,233,566 B1 | 5/2001 | Levine et al. |
| 6,292,787 B1 | 9/2001 | Scott et al. |
| 6,317,726 B1 | 11/2001 | O'Shaughnessy |
| 6,393,409 B2 | 5/2002 | Young et al. |
| 6,456,982 B1 | 9/2002 | Pilipovic |
| 6,484,151 B1 | 11/2002 | O'Shaughnessy |
| 6,484,152 B1 | 11/2002 | Robinson |
| 6,601,044 B1 | 7/2003 | Wallman |
| 6,839,685 B1 | 1/2005 | Leistensnider et al. |
| 6,876,981 B1 | 4/2005 | Berckmans |
| 6,901,383 B1 | 5/2005 | Ricketts et al. |
| 6,938,009 B1 | 8/2005 | Herbst et al. |
| 6,947,901 B1 | 9/2005 | McCabe et al. |
| 6,985,880 B1 | 1/2006 | Hodgdon et al. |
| 7,024,388 B2 | 4/2006 | Stefek et al. |
| 7,031,937 B2 | 4/2006 | Brown et al. |
| 7,035,820 B2 | 4/2006 | Goodwin et al. |
| 7,076,461 B2 | 7/2006 | Balabon |
| 7,085,738 B2 | 8/2006 | Tarrant |
| 7,089,202 B1 | 8/2006 | McNamar et al. |
| 7,089,205 B1 | 8/2006 | Abernethy |
| 7,092,857 B1 | 8/2006 | Steiner |
| 7,099,838 B1 | 8/2006 | Gastineau et al. |
| 7,107,229 B1 | 9/2006 | Sullivan |
| 7,117,175 B2 | 10/2006 | Arnott |
| 7,127,423 B2 | 10/2006 | Dunning et al. |
| 7,194,468 B1 | 3/2007 | Bacila et al. |
| 7,222,095 B2 | 5/2007 | Squyres |
| 7,249,086 B2 | 7/2007 | Bloom et al. |
| 7,272,578 B1 | 9/2007 | Leistensnider et al. |
| 7,295,987 B2 | 11/2007 | Graff |
| 7,299,205 B2 * | 11/2007 | Weinberger ................ 705/36 R |
| 7,395,236 B2 | 7/2008 | Degraaf et al. |
| 7,444,300 B1 | 10/2008 | Broms et al. |
| 7,496,531 B1 | 2/2009 | Gastineau et al. |
| 2001/0025266 A1 | 9/2001 | Gastineau et al. |
| 2001/0039526 A1 | 11/2001 | Pittenger |
| 2002/0007329 A1 | 1/2002 | Alcaly et al. |
| 2002/0032629 A1 | 3/2002 | Siegel et al. |
| 2002/0038271 A1 | 3/2002 | Friend et al. |
| 2002/0052820 A1 | 5/2002 | Gatto |
| 2002/0059126 A1 | 5/2002 | Ricciardi |
| 2002/0059127 A1 | 5/2002 | Brown et al. |
| 2002/0062272 A1 | 5/2002 | Kim et al. |
| 2002/0116310 A1 | 8/2002 | Cohen et al. |
| 2002/0116311 A1 | 8/2002 | Chalke et al. |
| 2002/0120570 A1 | 8/2002 | Loy |
| 2002/0123952 A1 | 9/2002 | Lipper |
| 2002/0133447 A1 * | 9/2002 | Mastman ..................... 705/36 |
| 2002/0156713 A1 | 10/2002 | Gaini |
| 2002/0178039 A1 | 11/2002 | Kennedy |
| 2002/0184126 A1 * | 12/2002 | McIntyre et al. .............. 705/35 |
| 2003/0014343 A1 | 1/2003 | Jones |
| 2003/0018556 A1 * | 1/2003 | Squyres ....................... 705/36 |
| 2003/0018563 A1 | 1/2003 | Kilgour et al. |
| 2003/0065600 A1 | 4/2003 | Terashima et al. |
| 2003/0065602 A1 | 4/2003 | Yip |
| 2003/0074306 A1 | 4/2003 | Rios et al. |
| 2003/0093352 A1 | 5/2003 | Muralidhar et al. |
| 2003/0105697 A1 | 6/2003 | Griffin et al. |
| 2003/0120577 A1 | 6/2003 | Sakui et al. |
| 2003/0120578 A1 * | 6/2003 | Newman ..................... 705/36 |
| 2003/0182219 A1 | 9/2003 | Bodurtha et al. |
| 2003/0212621 A1 | 11/2003 | Poulter et al. |
| 2003/0225657 A1 | 12/2003 | Whaley et al. |
| 2003/0225658 A1 | 12/2003 | Whaley |
| 2003/0229555 A1 | 12/2003 | Marlowe-Noren |
| 2004/0024671 A1 * | 2/2004 | Freund ........................ 705/35 |
| 2004/0044505 A1 | 3/2004 | Horwitz |
| 2004/0068456 A1 | 4/2004 | Korisch |
| 2004/0111352 A1 * | 6/2004 | Kim ........................... 705/36 |
| 2004/0117284 A1 | 6/2004 | Speth |
| 2004/0133497 A1 * | 7/2004 | Spear ......................... 705/36 |
| 2004/0167847 A1 | 8/2004 | Nathan |
| 2004/0181477 A1 * | 9/2004 | Sauter et al. .................. 705/36 |
| 2004/0193528 A1 | 9/2004 | Sadre |
| 2004/0210504 A1 | 10/2004 | Rutman |
| 2004/0236661 A1 | 11/2004 | Benning |
| 2004/0267657 A1 | 12/2004 | Hecht |
| 2005/0010481 A1 | 1/2005 | Lutnick et al. |
| 2005/0015326 A1 | 1/2005 | Terry |
| 2005/0038725 A1 | 2/2005 | Boyle et al. |
| 2005/0049952 A1 * | 3/2005 | Carter ........................ 705/36 |
| 2005/0108148 A1 | 5/2005 | Carlson |
| 2005/0114251 A1 | 5/2005 | Sperandeo |
| 2005/0149422 A1 | 7/2005 | Van Lier |
| 2005/0171894 A1 | 8/2005 | Traynor |
| 2005/0222941 A1 | 10/2005 | Tull |
| 2005/0246255 A1 | 11/2005 | Rousseau et al. |
| 2006/0041489 A1 | 2/2006 | Arnott |
| 2006/0059074 A1 | 3/2006 | Freund |
| 2006/0064364 A1 | 3/2006 | Whitehead |
| 2006/0074787 A1 | 4/2006 | Perg et al. |
| 2006/0100949 A1 | 5/2006 | Whaley et al. |
| 2006/0100950 A1 | 5/2006 | Hecht |
| 2006/0100955 A1 | 5/2006 | Baldassini et al. |
| 2006/0161489 A1 | 7/2006 | Allen et al. |
| 2006/0200395 A1 | 9/2006 | Masuyama et al. |
| 2006/0224487 A1 | 10/2006 | Galdi |
| 2006/0224494 A1 | 10/2006 | Pinkava |
| 2007/0016497 A1 | 1/2007 | Shalen et al. |
| 2007/0027790 A1 | 2/2007 | Gastineau et al. |
| 2007/0043650 A1 | 2/2007 | Hughes et al. |
| 2007/0055599 A1 | 3/2007 | Arnott |
| 2007/0061235 A1 | 3/2007 | Timmons et al. |
| 2007/0179874 A1 | 8/2007 | Spirgel et al. |
| 2007/0239583 A1 | 10/2007 | Williams |
| 2007/0288339 A1 | 12/2007 | Squyres |
| 2008/0071699 A1 | 3/2008 | Catalano-Johnson |
| 2008/0071700 A1 | 3/2008 | Catalano-Johnson |
| 2008/0140547 A1 | 6/2008 | Murphy et al. |
| 2008/0208769 A1 | 8/2008 | Beer et al. |
| 2008/0215502 A1 | 9/2008 | Sabbia |
| 2008/0235121 A1 | 9/2008 | Gonen |
| 2008/0243721 A1 | 10/2008 | Joao |
| 2008/0270317 A1 | 10/2008 | Waldron et al. |
| 2009/0006267 A1 | 1/2009 | Fergusson et al. |

| | | |
|---|---|---|
| 2009/0063363 A1 | 3/2009 | Present et al. |

FOREIGN PATENT DOCUMENTS

| | | |
|---|---|---|
| GB | 2393532 | 3/2004 |
| GB | 2419011 A | 4/2006 |
| JP | 2001249962 A | 9/2001 |
| JP | 20010249962 | 9/2001 |
| JP | 2003-044664 | 2/2003 |
| JP | 2004259156 A | 9/2004 |
| WO | WO-96/06402 A2 | 2/1996 |
| WO | WO-98/44444 | 10/1998 |
| WO | WO-99/23592 A1 | 5/1999 |
| WO | WO-00/16226 A1 | 3/2000 |
| WO | WO-01/33402 A2 | 5/2001 |
| WO | WO-01/37168 A2 | 5/2001 |
| WO | WO-01/39005 A2 | 5/2001 |
| WO | WO/01/46846 A1 | 6/2001 |
| WO | WO 02/093322 | 11/2002 |
| WO | WO 02/095639 | 11/2002 |
| WO | WO 03/009094 | 1/2003 |
| WO | WO-2006/089565 A2 | 8/2006 |
| WO | WO-2006/103474 A2 | 10/2006 |

OTHER PUBLICATIONS

Business Wire, Investment-Technlgies; (IVES) Jan. 6, 1989, p. 1.*
Diversity-Weighted Indexing, Robert Femholz, Journal of Portfolio Management, Winter 1998, pp. 74-82.*
Investing at the edge (investing in non-capitalization weighted index funds), Jarrod W Wilcox, Journal of Portfolio Management, New York, Spring 1998,vol. 24, Iss. 3; 16 pgs.*
Office Action dated Nov. 25, 2008 issued in related U.S. Appl. No. 10/961,404.
Office Action issued Dec. 5, 2008 in related CN application No. 200580000459.0.
Decision issued Feb. 2, 2009 in related GB application No. 0616163.2.
Decision issued Feb. 19, 2009 in related GB application No. 0222239.6.
International Search Report and Written Opinion issued Dec. 21, 2007 in related Appl. PCT/US2006/042430.
Kaplan, Paul, "Let's Not All Become Fundamental Indexers Just Yet," Journal of Indexes, Jan./Feb. 2009, pp. 34-37.
Point/Counterpoint, "The Fundamental Debate," Journal of Indexes, Jan./Feb. 2009, pp. 30-33, continued on p. 51.
Prestbo, John, In Perspective; "Weighting It Out," Journal of Indexes, Jan./Feb. 2009, pp. 38-40.
Author Unknown, "The Role of high Yield Bonds," www.pimco.com, Publication, Feb. 2006, pp. 1-5.
Robert Arnott et al., "Fundamental Indexation;" Research Affiliates Oct. 7, 2004, pp. 1-35.
Author Unknown, FRC Monitor, "Industry Trends," Nov. 2005.
Author Unknown, "Separately Managed Accounts to Become Dominant Vehicle for Individual Securities," Tower Group Research, www.advisorpage.com/modules, Advisor Page, Competitive Intelligence, Feb. 6, 2008.
Pruitt, Ron, "The Tax Advisor: All Hail the Overlay Manager," Placemark Investments, Investment Advisor, Apr. 2005.
Pruitt, Ron, "A Comprehensive View of After-tax Investing and Tax Efficiency," Placemark Investment, 2002.
Coyle, Thomas, "SunGard Hunts Trust Assets With Overlay Offering," SunGard Managed Account Solutions, www.sungard.com/Managed Accounts, Aug. 30, 2004.
Reinhart, Len, "The Bigger Picture: Will Overlay Management Become the New Business Model for Separately Managed Accounts?" Financial-Planning.com, Apr. 1, 2007.
Search Results, TowerGroup, Sep. 25, 2007.
Reinhart, Len, "The Next Big Thing: Unified Managed Accounts Must Mature Some More Before They Are Ready for Prime Time." Financial-Planning.com, Dec. 1, 2003.
Author Unknown, "Generation OPM," Wall Street Technology, www.wallstreetandtech.com, Oct. 25, 2004.
Gaffen, David A., "SMAs Take on Multiple Personalities," www.registeredrep.com, May 1, 2003.
Arnott, Robert D. et al., "The Management and Mismanagement of Taxable Assets," First Quadrant, L.P., Investment Management Reflections, 2000, No. 2.
FRC Monitor, Jan. 2001, pp. 1-12.
Waid, Robert, "Fundamentally Active," IndexUniverse.com, www.indexuniverse.com/index, Feb. 8, 2008, pp. 1-6.
Hemminki, Julius et al., "Fundamental Indexation in Europe," Journal of Asset Management, vol. 8, 6, pp. 401-405, www.palgrave-journals.com/jam, Oct. 26, 2007.
Morris, Stephen, "Caress Working Paper #95-13 Speculative Investor Behavior and Learning," Department of Economics, University of Pennsylvania, Philadelphia, PA, May 1995.
Author Unknown, "MSCI to Adjust for Free Float and to Increase Coverage to 85%," MSCI Press Release, www.msci.com, Geneva, Dec. 10, 2000, pp. 1-3.
Brandhorst, Eric, "MSCI's Methodology Enhancements: Free-Float and Capitalization Extension," www.ssga.com, Jul. 20, 2001, pp. 1-6.
Office Action received Apr. 28, 2009 in related EP 05 712 005.7.
International Preliminary Report on Patentability issued Mar. 24, 2009 in related PCT/US2006/042430.
Office Action issued Jul. 8, 2009 in related U.S. Appl. No. 11/509,002.
Paul C. Wood and Richard E. Evans, "Fundamental Profit-Based Equity Indexation", Journal of Indexes, Second Quarter 2003, pp. 25-31.
Office Action issued Aug. 6, 2009 in related U.S. Appl. No. 10/159,610.
Office Action issued Aug. 19, 2009 in related U.S. Appl. No. 10/961,404.
Chernoff, Joel, "A New Look in Benchmarks: Consultant Devises Alternative Based on Country Wealth," Pensions & Investments Online, Issue Date: Apr. 14, 1997.
Scott Burns, "Next-Generation Index Funds Coming," Dallas Morning News, Nov. 26, 2004.
Arnott, Robert, Hsu, Jason, Moore, Phil, "Redefining Indexation," Sep. 9, 2004.
Author Unknown, "Optimal Value-Weighted Portfolios," Economist's View: Value Weighted Portfolios, Jun. 14, 2006.
Author Unknown, "Stock Market Perspective: Better Ways to Index?" http://www.pankin.com/persp062.pdf.
Wooley, Scott, "The Index Insurgents," Forbes.com, Magazine article, Oct. 30, 2006.
Arnott, Robert D., "An Overwrought Orthodoxy", Institutional Investor Magazine, Dec. 2006.
Hsu, Jason D., "Cap-Weighted Portfolios are Sub-Optimal Portfolios", Journal of Investment Management, vol. 4, No. 3, Jul. 2006.
Arnott, Robert D., "Disentangling Size and Value", Financial Analyst Journal, Sep. 2005.
Arnott, Robert D., et al., "Does Noise Create the Size and Value Effect?", Working Paper, Jan. 2007.
Arnott, Robert D., et al., "Fundamental Indexes: Current and Future Applications", Institutional Investor Journals, Fall 2006.
Tamura, Hirmichi, et al., Global Fundamental Indices: Do they outperform market-cap weighted indices on a Global Basis?, Security Analysts Journal, Oct. 2005.
Siegel, Jeremy J., "Long-term Returns on the Original S&P 500 Components", Financial Analyst Journal, vol. 62, No. 1, Jan. 2006.
Asness, Clifford, "New and Improved Same Old Thing: The Value of Fundamental Indexing", Institutional Investor Magazine, Oct. 2006.
Arnott, Robert D., et al., "Noise CAPM and the Size and Value Effects", Journal of Investment Management, vol. 5, No. 1, Jan. 2007.
Siegel, Jeremy, "The 'Noisy Market' Hypothesis", Wall Street Journal, vol. 62, No. 1, Jun. 2006.
Research Affiliates Fundamental Index™ Fundamental Index™ Enhanced Power Point Presentations.
Retrospectives on Selected Enhanced Fundamental Index™ Strategies.
Research Affiliates, LLC Fact Sheets on RAFI™—Related—Limited Partnerships.
Unknown, "South Dakota Signs On With New Strategy", Pensions & Investments Online, Jan. 10, 2005.

Arnott, Robert D., "*Whither Finance Theory*", Financial Analysts Journal, Jan./Feb. 2005.
Petruno, Tom, "*New Take On Index Fund Concept*", Los Angeles Times, Jun. 26, 2005.
Hulbert, Mark, "*A Stock Market Riddle, May Have An Answer*", The New York Times, Jul. 3, 2005.
Foster, Mike, "*Playing Poker With The Indices*", Financial News, Jul. 11, 2005.
Jamieson, Dan, "Money Manager Challenges Cap-Weighted Market Indexes", Investment News, Jul. 18, 2005.
Coggan, Philip, "*A Sound Idea With Solid Backing*", Financial Times, Jul. 18, 2005.
Unknown, "FTSE and Rob Arnott Launch First Fundamental Indexes", Press Release, Jul. 19, 2005.
Unknown, "Nomura Asset Management and Research Affiliates To Launch Products Based On Fundamental Indexation", Press Release, Aug. 19, 2005.
Arvedlund, Erin E., "*Wall Street Pushes Designer Index Funds*", The Wall Street Journal, Aug. 25, 2005.
Unknown, "*San Joaquin Ups Value-Added Real Estate Allocation*", Pensions & Investments Online, Aug. 30, 2005.
Burr, Barry B., "Fundamental Index Concept Gets Institutional Investors' Attention", Pensions &Investments Online, Sep. 19, 2005.
Clements, Jonathan, "When Good Index Funds Go Bad: The Case For A 'Fundamental' Strategy", The Wall Street Journal Online, Sep. 21, 2005.
Unknown, "Canadian Fundamental 100 Income Fund Announces Initial Public Offering", Canada Newswire, Sep. 28, 2005.
Capon, Andrew, "*Beta Boosting*", Institutional Investor, Oct. 2005.
Burr, Barry B., "*Arnott, CFA Ethical Dance*", Pensions & Investments Online, Oct. 17, 2005.
Unknown, "*Letters to the Editor*", Pensions & Investments Online, Oct. 31, 2005.
Kinnel, Russel, "*The Five Best New Funds of 2005*", Morningstar.com, Nov. 7, 2005.
Unknown, "New Fundamental Index Series Launched by FTSE Group And Research Affiliates", PressRelease, Nov. 28, 2005.
Unknown, "PowerShares FTSE RAFI US1000 ETF Celebrates IPO On The NYSE", NYSE.com, Dec. 19, 2005.
Shazar, Jonathan, "Taking On A Heavyweight: Two Strategies—With Attendant ETFs—Take Aim At Market-Cap Weighting", Institutional Investor, Jan. 24, 2006.
Beales, Richard, "*Getting Back To Fundamentals*", Financial Times, Feb. 24, 2006.
Beales, Richard, "Getting Back To Fundamentals", Financial Times, Feb. 24, 2006.
Brockman, Joshua, "The New Calculus Of Designer ETFs, Financial Engineers Create Enhanced Indexes" Kiplinger.com, Jun. 2006.
Goldberg, Steven, "Value Added, Don't Give Upon The S&P 500", Kiplinger.com, Mar. 21, 2006.
Luxenberg, Stan, "Fundamental 'Indexing", Registered Rep, Jul. 1, 2006.
Rinne, Jonas, "Translation From Swedish: The Stock Market's New Fundamentalist", Affarsvarlden, Apr. 19, 2006.
Salzinger, Mark, "An Indexing Alternative", No Load Fund Investor, Jul. 2006.
Shazar, Jonathan, "Taking On A Heavyweight: Two Strategies—With Attendant ETFs—Take Aim At Market-Cap Weighting", Institutional Investor, Jan. 24, 2006.
Strauss, Lawrence C., "Too Many ETFs?", Barrons, Jul. 3, 2006.
Greenberg, Gregg, "The Brains Behind Fundamental Indexing", TheStreet.com, Jul. 25, 2006.
Lauricella, Tom, et al., "Fund Track, Buyer Beware; Not All Index ETF's Are What They Appear", The Wall Street Journal Europe, Jul. 24, 2006.
Kinnel, Russ, "Fund Spy Column: Four Great Funds For 401K's And Iras Only", Morningstar, Jul. 24, 2006.
Unknown, "Asset Allocation Basics: Rebalancing", Seeking Alpha, Jul. 10, 2006.
Unknown, "CRQ, PowerShares Autonomic Allocation ETFs Cited In 'Portfolio Strategy'", Toronto Globe & Mail, Jul. 24, 2006.
Unknown, "Recap Of No-Load Fund Investor Coverage Of PRF, Boroson On Money", Daily Record (Morristown, NJ), Jul. 23, 2006.
Carrel, Lawrence, "Exchange-Traded Funds: ETF Focus Index Wars", SmartMoney.com, Aug. 16, 2006.
Watt, James L., CPA/PFS, "Is fundamental Indexing A Better Way To Index?", Fort Collins Coloradoan, Jul. 30, 2006.
Salisbury, Ian, "PowerShares FTSE RAFI US1000 In Article On Actively Managed ETF's", Wall Street Journal, Jul. 30, 2006.
Savage, Steve, et al., "Kiplinger's Personal Finance Investing: Fund Insights, A Better Way Of Indexing?", Kiplinger, Aug. 2006.
Unknown, "Ten to Watch 2006", Registered Rep, Aug. 1, 2006.
Goldberg, Steven, "Wretched Excess Hits ETFs", Kiplinger.com, Aug. 3, 2006.
Siegel, Jeremy, "Consuelo Mack WealthTrack", PBS TV, Aug. 4, 2006.
Coggan, Philip, "Report: FT Fund Management, Fundamental Indices Are Proving Their Worth", Financial Times—UK Edition, Aug. 7, 2006.
Unknown, "Investing: Throughbred Indexes Work To Sustain Pace", International Herald Tribune, Aug. 7, 2006.
Kittsley, Dod, "Alternatively Weighted Indexes: Strategy Or Benchmark?", Investment News, Op-Ed, Aug. 8, 2006.
Simon, Ellen, "New Indexes Aim To Beat Old Benchmarks", Associated Press Newswire, Aug. 8, 2006.
Simon, Ellen, "New Indexes Spiceup ETFs", Associated Press, Aug. 12, 2006.
Wherry, Rob, "Happy B-Day Vanguard 500", SmartMoney.com, Aug. 31, 2006.
Unknown, "Growth-stock Investing Has Required The Patience Of Job During The Last Few Years", New York Times, Sep. 3, 2006.
Haines, Lisa et al., "AP2 Considering Expanding Use Of Fundamental Indexation", Financial News (U.K.), Sep. 4, 2006.
Unknown, "Claymore Investments Announces New (RAFI) ETFs, On TSX", Canada Newswire: Claymore Investments, Inc., Sep. 8, 2006.
Unknown, "XACT—First In Europe With A fundamental ET," Announcing Launch Of The Exact FTSE RAFI Fundamental Euro ETF On The Stockholm Stock Exchange, And FTSE Licenses First European ETF On FTSE RAFI Index, XACT, Sep. 11, 2006.
Unknown, "Fundamental Indices Show Resilience", Financial News, Sep. 11, 2006.
Skypala, Pauline, "Stock Market Indices Prove Inefficien", Financial Times—UK Edition, Sep. 12, 2006.
Carrigan, Bill, "Being In Right Sector Proves Key With ETFs", Toronto Star, Business: Getting Technical, Sep. 15, 2006.
Unknown, "Breaking News: PowerShares Spreads The Love", IndexUniverse.com, Sep. 15, 2006.
O'Connor, Cecily, "A Fundamental Change, Research Affiliates, With 55% Gain So Far This Year, Applies Its Index Concept Beyond U.S. Stocks", Pensions & Investments Money Management, Sep. 18, 2006.
Unknown, "Merrill Lynch Claymore International Fundamental Index Accelerator Securities, Series 1", Canada NewsWire, Sep. 19, 2006.
Unknown, "ETF Versus No-Loads", No-Load Fund Investor, Sep. 19, 2006.
Carrel, Lawrence, "Exchanging Exchanges", SmartMoney.com, Sep. 20, 2006.
Conboy, Bill et al., "PowerShares Capital Management Launches Ten New ETF Portfolios On NASDAQ", M2 Presswire, Sep. 20, 2006.
Unknown, "FTSE RAFI Indexes To Be Used As Basis For World's First Fundamentally Weighted Sector ETF's", PR Newswire, Sep. 20, 2006.
Steel, Sandra, "FTSE RAFI Indexes To Be Used As Basis For The World's First Fundamentally Weighted Sector ETFs, Ten Fundamental Indexes Out-Perform Domestic Cap Weighted Equivalents", Media Information i.e. Press Release From FTSE The Index Company, Sep. 20, 2006.
Unknown, "Rob On Consuelo Mack WealthTrack", PBS Interview, Sep. 22, 2006.
Unknown, "PowerShares Pitches Alt-Weighted ETFs", Fund Action, Sep. 22, 2006.
O'Connor, Cecily, "At Research Affiliates, A Fundamental Change", Investment News. Sep. 25, 2006.

O'Donnell, Kathie, "One On One With Philip Taylor Of AMVESCAP PLC, On New RAFI PowerShares", Investment News, Sep. 25, 2006.
Knight, Rebecca, "FT Wealth: Hands-On Investor, ETFs Start To Look Beyond The Index Model", Financial Times, Sep. 26, 2006.
Korn, Donald Jay, "Beyond Benchmarks, Tracking Alternative Indexes Can Add A Flavor Of Active Management To The ETF Menu", Financial Planning, Oct. 1, 2006.
Saler, Tom, "Growing To The Sky", Barrons, Oct. 2, 2006.
Spence, John, "ETF Investing, For These ETFs, The Fundamental Things Apply, Firms, Experts Take Sides In Clash Over Best Investment Strategy", MarketWatch (Boston), Oct. 2, 2006.
Knight, Rebecca, "FT Report: FT Fund Management: The Big Picture", Financial Times, Oct. 2, 2006.
Ryan, Jen, "Ask The Street: So Many ETFs", TheStreet.com, Oct. 4, 2006.
Schlagheck, Jim, "Exchange Traded Funds, Getting An Edge With Fundamental Indices", TheStreet.com., Oct. 5, 2006.
Farrell, Christopher, Personal Finance, Battle For The Index Investor, Business Week, Oct. 9, 2006.
Tan, Kopin, "Lipper Mutual Fund Quarterly, The Weighting Game", Barron's, Oct. 9, 2006.
Unknown, "Alternative Indices", Financial Times (U.K. Edition), Oct. 13, 2006.
Nusbaum, Roger, "Personal Finance: ETFs, A Surge Of Energy ETFs", TheStreet.com, Oct. 13, 2006.
Kinnel, Russell, "Fund Spy, Great Mutual Funds Go Head To Head, It's Marsico Vs. Janus And Fidelity Vs. Vanguard", Morningstar.com, Oct. 16, 2006.
Baker, Nick, "Arnott's 'Fundamental' Stock Index Beats S&P, 500, Sparks Debate", Bloomberg.com, Oct. 18, 2006.
Baker, Nick, "Business: Marketplace By Bloomberg: Around The Markets, Rebuilding Indexes From Ground Up", International Herald Tribune, Oct. 19, 2006.
Baker, Nick, "Financial Post: FP Investing, Manager Adds Twist To Index Investing: Focus On Fundamentals", National Post (Canada), Oct. 19, 2006.
Bloomberg News, "Is Jobs' Job Safe Amid Options Scandals?, Business, Analyst Touts 'Fundamentals'", St. Paul Pioneer Press, (St. Paul, Minnesota ), Oct. 22, 2006.
Sivanithy, R., "Companies: Is Fundamental Weighting Better In Nourse Indices?" The Business Times Singapore, Oct. 27, 2006.
Pender, Kathleen, "Bogle Shares His Wisdom", San Francisco Chronicle, Oct. 29, 2006.
Hajim, Corey, "Smart Strategies, A Better Way To Index?", Fortune, Oct. 30, 2006.
Editorial Staff, "Marketplace", OnWallStreet, Nov. 1, 2006.
Voyles, Bennett, "New Kid In Town: The Fundamental Index", OnWallStreet, Nov. 1, 2006.
Unknown, "Breaking News, SSgA Goes Fundamental", IndexUniverse.com, Nov. 2, 2006.
Hoffman, David, "ETF Powerhouses Leery Of Fundamental Indexing", InvestmentNews.com, Nov. 6, 2006.
Dunstan, Barrie, "Supplement: Quarterly Review Of Funds, Fundamental Shift Towards Value Is Best Of Both Worlds", Australian Financial Review On Fundamental Indexation, Nov. 8, 2006.
Burns, Scott, "The Looming Battle: Fundamental Vs. Traditional Indexing", Scottburns.com, Nov. 11, 2006.
Burns, Scott, "As Index Funds Duke It Out, It Pays To Be Skeptical", The Boston Globe Via Boston.com, Nov. 12, 2006.
Burns, Scott, "Indexing Idea Has A Challenger", The Dallas Morning News Via DallasNews.com, Nov. 12, 2006.
Dunstan, Barrie, "News: Managed Funds—A Third Way: Fundamental Indexing (Sub-Head) There Is Fresh Life In The Debate Between Active Share Managers and Index Fund Managers", Independent Financial Review (New Zealand), Nov. 15, 2006.
Carrick, Rob, "Report On Business: Globe Investor: Portfolio Strategy, New ETFs Will Whet Your Appetite (Sub-Head) The Products May Satisfy Investors Who Like The Low Cost And Flexibility Of These Funds That Trade Like A Stock", The Globe & Mail (Toronto), Nov. 18, 2006.

Plumpton, Emma (Redmayne-Bentley Stockbrokers), "Influence Of Geography On The Wane", Aberdeen Press & Journal (UK), Nov. 20, 2006.
Carpenter, Margie et al., "Rethinking The World: Global Economic Changes Are Demanding A More Sophisticated Evaluation Of Your Clients' Portfolio Allocations", Financial Planning Magazine, Dec. 1, 2006.
Gotlieb, Rish, "Why Portfolio Pros By ETFs, Money Managers Who Don't Have The Time To Specialize In Every Market Use The Convenience Of Exchange-Traded Funds", Toronto Star, Dec. 7, 2006.
Hougan, Matthew, "Life From The Superbowl", IndexUniverse.com, Dec. 7, 2006.
Morris, Sonya, "Fund Spy—What's The Right Way To Index? (Sub-Head) Our Take On The Newest Breed Of Index Funds", Morningstar.com, Dec. 12, 2006.
Unknown, "The Buttonwood Column, Weights And Measures, A Squabble Erupts Over How Best To Create A Stockmarket Index", The Economist Newspaper Limited (London), Dec. 13, 2006.
Woods, Nancy, "Financial Post: FP Weekend: Ask A Broker Column, Working Toward A Balanced Portfolio", National Post (Canada), Dec. 16, 2006.
Critchley, Barry, "Financial Post: Off the Record, Merrill (ML), Claymore (C) Steal A March," National Post (Canada), Dec. 19, 2006.
Unknown, "RA Among Enhanced-Index Managers Approved By Tacoma ERS", Pension & Investment Daily, Dec. 19, 2006.
Wherry, Rob, "Battle For Index Supremacy, And Centers Of Attention: A New Generation Of Indexers Want To Replace The S&P 500. Should You Follow Their Lead", SmartMoneySelect.com, Dec. 22, 2006.
Burns, Scott, "Sloth, Passivity Yield Tidy Profit, Index Funds And Broad Asset Class Diversification Keep Investing Simple", Austin-American Statesman, Statesman.com, Personal Finance, Dec. 24, 2006.
Ransom, Diana et al., "Talk The Talk: Financial Buzz Words Of '07", Wall Street Journal, Dec. 26, 2006.
Time Middleton, "Mutual Funds, A Play-It-Safe Portfolio For 2007", MSN Money, Dec. 26, 2006.
Salzinger, Mark, "Feature Interview With Jason Hsu", Investor's ETF Report Jan. 2007.
Unknown, "Bettering Fundamentals", IndexUniverse.com, Jan. 4, 2007.
Salisbury, Ian, "New ETFs To Weight Stocks By Revenue", Dow Jones, Jan. 4, 2007.
Wherry, Rob, "SmartMoney.com Picks The Best Mutual Fund Of 2006", SmartMoney.com, Jan. 5, 2007.
Riley, Barry, "A Quest For Perpetual Profit Machines", Financial Times, Jan. 15, 2007.
Burton, Jonathan, "Putting ETFs In Their Place: Vanguard Indexing Guru Gus Sauter On The Best Kind Of Exchanged-Traded Fund", MarketWatch.com, Jan. 9, 2007.
Fox, Justin, "Fundamentally Okay Index Funds", Time.com, Jan. 29, 2007.
Knight, Rebecca et al., "Active Solution Is Within Reach: In The Second Part In A Series, Rebecca Knight And John Authers Say The Asset Class Could Move Beyond The Passive Approach In 2007", Financial Times, Jan. 30, 2007.
Baker, Nick, et al., "Fundamental' Index Sparks Debate: Arnott's FTSE RAFI US 1000 Beats The S&P 500 With A New Stock Weighting Method", Boomberg Markets Magazine, Feb. 2007.
Fazzi, Raymond, "Surprisingly Few Surprises: Value Funds, International Equities And REITS Remained Strong Last Year", Financial Advisor, Feb. 2007.
Berman, David, "Claymore Fundamental Index ETF Among 'New Breed' Of ETFs", National Post (Canada), Feb. 1, 2007.
Jacobius, Arleen, "Acting On Faith: Institutional Investors Are Leaping Into Alternative Investments, But Lack Tools To Assess The Risks", Pensions & Investments, Feb. 5, 2007.
Heuer, Max, "All The Rage: Schwab Joins Fundamental Indexers", Institutional Investor Newsletter, Feb. 5, 2007.
Tassel, Tony, "Building On The Fundamentals", Financial Times—U.S. Edition, Feb. 6, 2007.

Bogle, John C., "'Value' Strategies", Wall Street Journal, Feb. 9, 2007.
Lowry, Vincent T., "*Fundamentally Better: The case for revenue weighting*," Journal of Indexes, Mar./Apr. 2007.
Burke, Kevin, "The ETF Weighting Game," Registered Rep./www.registeredrep.com, Apr. 2007, pp. 79-88.
Unknown, "The most dangerous patent in finance! Is fundamental indexing patently absurd?," Research Comment, Desjardins Securities, May 7, 2007.
David Hoffman, "Non-Traditional Indexes Gaining Ground in ETF World," Investment News, Feb. 12, 2007.
Rob Wherry, "Ready For An All-ETF Portfolio? Here Are Some Models," SmartMoney.com, Feb. 13, 2007.
Ray Turchansky, "Investment Vehicle Lines Get Blurry: Merits of Passive Versus Active Management Debated," Edmonton Journal, Feb. 14, 2007.
Jonathan Chevreau, "Trading Begins Today on Two New Exchange-Traded Funds From Claymore Investments," National Post (Canada), Feb. 14, 2007.
Trang Ho, "Exchange-Traded Funds: After An Excellent '06, Fast Start For Telecom," Investor's Business Daily, Feb. 16, 2007.
Matthew Richards, "Get Down To The Fundamental Factors," Financial Times, Feb. 17, 2007.
Warren Boroson, "A New Strategy For Stock Indexes," Daily Record, Feb. 18, 2007.
David Hoffman, "Weightings Ignoring Market Caps Gain In Popularity," Pensions&Investments Online, Feb. 19, 2007.
Trang Ho, "Exchange-Traded Funds: Consumer ETFs Reflect Strong Buying Trends," Investor's Business Daily, Feb. 20, 2007.
Diya Gullapalli, "On Tap: Retirement-Oriented Offerings," The Wall Street Journal, Feb. 22, 2007.
Rob Carrick, "For Your RRSP, Take a Page from the CPP," The Globe & Mail (Toronto), Feb. 24, 2007.
Rudy Luukko, "Enhanced Indexing Cuts Costs of Funds," Toronto Star, Feb. 24, 2007.
Brooke Southall, "Malkiel Defends Investing Strategy," Investment News, Feb. 26, 2007.
Brooke Southall, "Merrill Lynch Claymore International Fundamental Index Accelerator Securities, Series 2," Canada Newswire, Feb. 27, 2007.
Susan Trammell, "Applied Science: How to Jump-Start a Quantitative Investment Process," CFA Magazine, Mar./Apr. 2007.
Eric Uhlfelder, "Challenging EAFE: Managers Who Closely Track Market-Cap-Weighted Country Indexes May Miss Opportunities," Financial Advisor Magazine, Mar. 1, 2007.
John C. Bogle, "False Promises: Index Funds That Promise to Beat the Market," Journal of Indexes, Mar./Apr. 2007.
Vincent T. Lowry, "Fundamentally Better: The Case for Revenue Weighting," Journal of Indexes, Mar./Apr. 2007.
Ron Hylton, "It's The Volatility, Stupid: The Source of Excess Returns in Alternative Index Weighting Schemes," Journal of Indexes, Mar./Apr. 2007.
Eugene F. Fama, Kenneth R. French, "Straight Talk: Nouveau Indexes, Noise and the Nonsense of Active Management," Journal of Indexes, Mar./Apr. 2007.
Sonya Morris, Editor, "Introducing Model Portfolios," Morningstar ETFInvestor, Mar. 1, 2007.
Donald Jay Korn, "ETF Mania!," Financial Planning, Mar. 1, 2007.
David Hoffman, "New ETFs Highlight Belief That Simple Is Good," Investment News, Mar. 5, 2007.
Charles Paikert, "Oyster Bar powwow no pearl for Street," Investment News, Mar. 5, 2007.
Charles Paikert, "AIM Investments® Launches AIM Independence Funds," Yahoo!Finance, Mar. 6, 2007.
Charles Leary, "The Harsh Light of Day," IndexUniverse.com, Mar. 8, 2007.
Warren Boroson, "Tough Questions For Smart Manager," Daily Record, Mar. 25, 2007.
Warren Boroson, "New Fundamental Index Fund Listed In Stockholm," XACT, Mar. 26, 2007.
Tim Middleton, "With Market Reeling, Get More Aggressive," MSN Money, Mar. 27, 2007.

Tim Middleton, "Schwab To Launch Fundamental Index Mutual Funds," Reuters, Mar. 27, 2007.
Christine Ong, "AIM Vies For Lifecycle Edge By Diversification," Ignites.com, Mar. 28, 2007.
Karen Dolan, "Morningstar's Take: PIMCO Fundamental IndexPLUS TR D PIXDX," Morningstar, Mar. 28, 2007.
Jason Hsu, Jason Chia-Shang Tuan, "Indexing for an inefficient market," IPA, Apr. 1, 2007.
Jeffrey R. Kosnett, "Are Your Stocks Simply a Mishmash?," Kiplinger's Personal Finance, Apr. 1, 2007.
Brad Zigler, "Fundamentalism and Asset Allocation," Registered Rep, Apr. 1, 2007.
Kevin Burke, "The ETF Weighting Game," Registered Rep, Apr. 1, 2007.
Kathleen M. McBride, "Catching Up With . . . Jeffrey Mortimer," Investment Advisor Magazine, Apr. 1, 2007.
Sree Vidya Bhaktavatsalam, "Schwab Offers 'Fundamental' Index Funds to Beat Market Returns," Bloomberg, Apr. 2, 2007.
Kathleen M. McBride, "A Better Mousetrap?: Schwab Launches Three Fundamental Index Funds," Investment Advisor Magazine, Apr. 2, 2007.
Jesse Emspak, "Mutual Funds & Personal Finance: Schwab Focuses On Key Fundamentals," Investor's Business Daily, Apr. 2, 2007.
Murray Coleman "New Twist On Indexing: Mutual Funds Meet ETFs," MarketWatch, Apr. 2, 2007.
Rob Wherry, "Schwab Launches Three Funds Similar To Popular ETFs," SmartMoney.com, Apr. 2, 2007.
Rob Wherry, "Schwab Launches Fundamental Index™ Mutual Funds," Yahoo!Finance, Apr. 2, 2007.
Rob Wherry, "Fundamentally Schwab," IndexUniverse.com, Apr. 5, 2007.
Brooke Southall, "Fundamental Differences Over Schwab Funds," Investment News, Apr. 9, 2007.
Max Heuer, "Schwab Looks Up Market," Defined Contribution & Savings Plan Alert, Apr. 9, 2007.
Katie Benner, "Trying To Build a Better Index Fund: Fortune's Guide To Exchange-Traded Funds Based On Fundamental Indexes," CNN Money, Apr. 11, 2007.
Janet Kidd Stewart, "401(k) options worth looking over: Investors should keep track as firms pitch employers more ETFs," Chicago Tribune, Apr. 15, 2007.
John Kimelman, "ETF Pro Says Stocks Aren't Worth The Risk," Barron's, Apr. 20, 2007.
Peter A. McKay, "More Professors Are Lured Out of Ivory Tower to Street: Demand for New Funds Offers a Chance to Test Theories, Make Money," The Wall Street Journal, Apr. 21, 2007.
Peter A. McKay, "North Dakota Considers Research Affiliates," Money Management Letter, Apr. 23, 2007.
Michael Krause, "S&P 500 Shows Passive Aggressive Side," Yahoo!Finance, Apr. 24, 2007.
Philip Coggan, "Presenting the Portfolio Rebalancing Act: Fundamental Indexation Rejects Weighting Stocks Within a Benchmark by Market Value," Investment Advisor (UK), Apr. 28, 2007.
Paul J. Lim, "The Indexing Wars," U.S. News & World Report, Apr. 29, 2007.
Douglas Appell, "Fundamental Indexing Superiority Disputed: Claim of Cap-Weighting's Drag on Return is 'False'," Pensions &Investments Online, Apr. 30, 2007.
Douglas Appell, "Fund News (excerpt)," No-Load Fund Investor, May 1, 2007.
Kathleen M. McBride, "The IA 25: Robert Arnott," Investment Advisor Magazine, May 1, 2007.
James Picerno, "The ETF revolution is looking more speculative by the day," Wealth Manager, May 1, 2007.
Jonathan Clements, "Why Aiming for Average Has Its own Genius," The Wall Street Journal, May 6, 2007.
Peter Gibson, Ed Sollbach, Jeff Evans, Elizabeth Leung, "Research Comment: Portfolio Strategy & Quantitative Research," Desjardins Securities, May 7, 2007.
Douglas Appell, "Disputing the superiority of fundamental indexing," Investment News, May 7, 2007.
Heather Bell, "Fundamental Analysis," IndexUniverse.com, May 8, 2007.

Heather Bell, "News Briefs: Analysts wary of fundamental indexes," Pensions&Investments Online, May 14, 2007.
Julian Harding, "Worth the Weight," Pensions Management, May 15, 2007.
Vernon Wessels, "Plexus Will Use Arnott's Index to Choose South African Stocks," Bloomberg, May 18, 2007.
Vernon Wessels, "Plexus scores home run with international partner," Fanews, May 18, 2007.
Jackie Cameron, "New threat for active asset managers," Moneyweb, May 18, 2007.
Kazuaki Fujita, "Eye On Fundamentals Buoying Japanese Investors (translated)," Nikkei Financial Daily, May 18, 2007.
Rob Carrick, "The case for blending passive, active indexing," The Globe & Mail (Toronto), May 19, 2007.
Warren Boroson, "Expert predicts volatile market," Daily Record, May 20, 2007.
Regis Nyamakanga, "Stock index system due to launch in SA," Business Day, May 21, 2007.
Jesse Emspak, "Exchange-Traded Funds: Fundamental Indexing Fuels PowerShares ETF," Investor's Business Daily, May 23, 2007.
Jesse Emspak, "Four New Lyxor ETFs on Fundamental Indices Launched in the XTF Segment," Deutsche Borse Group, May 24, 2007.
Rob Carrick, "Got high-dollar blues? Currency neutrality can bring peace of mind," The Globe & Mail (Toronto), May 24, 2007.
Consuelo Mack, "A message from Consuelo (an email to WealthTrack subscribers from Consuelo Mack)," PBS WealthTrack, May 24, 2007.
Kathleen Pender, "Changing indexes for funds," San Francisco Chronicle, May 24, 2007.
Kathleen Pender, "Consuelo Mack WealthTrack: An Interview with Rob Arnott (transcript)," PBS WealthTrack, May 25, 2007.
John Authers, "It's time to point the finger at the index," Financial Times, May 26, 2007.
Burton Malkiel, "Many Happy Returns," Barron's, May 28, 2007.
Don Vialoux, "More ways to access Japan: Seven exchange-traded funds now available," National Post (Canada), May 28, 2007.
Brad Zigler, "Fundamentalists at the Gates: The Trouble With Cap-Weighted Indexes," Seeking Alpha, May 31, 2007.
Rob Wherry, "Enhanced Index Funds Make a Move on Their Older Brethren," SmartMoney.com, May 31, 2007.
Marla Brill, "Indexing Debate Heats Up," Financial Advisor Magazine, Jun. 1, 2007.
Marla Brill, "The age of investment strategy indices (Roundtable Discussion)," Global Pensions, Jun. 1, 2007.
Stephen P. Brown, "Actively Managed ETFs: The Next Generation?," Registered Rep, Jun. 1, 2007.
David A. Geracioti, "From Theory to Practice," Registered Rep, Jun. 1, 2007.
Laura du Preez, "New index investment method promises more," Personal Finance, Jun. 2, 2007.
Rob Wherry, "The Index-Fund Makeover," The Wall Street Journal, Jun. 2, 2007.
Warren Boroson, "Having 'fun' in market is costly," Daily Record, Jun. 3, 2007.
Sophia Grene, "The fundamental rules apply: Rising interest in wealth weighted indices," Financial Times, Jun. 4, 2007.
Sophia Grene, "IPM launches four Fundamental Index™ Funds," Press Release, Jun. 5, 2007.
David Williams, "Want another 5% on top? (Interview with Paul Stewart)," Business Day, Jun. 7, 2007.
Sophia Grene, "Dilsaver Reveals Schwab Funds' Biggest Secret," MutualFundWire.com, Jun. 7, 2007.
Julia Taylor, "New Funds: Informed Portfolio Management," Financial Times, Jun. 11, 2007.
Pam Black, "Press Release for 'Index Smackdown' debate between Rob Arnott and Gus Sauter," Financial Planning, Jun. 12, 2007.
Lawrence Carrel, "Godfather of Fundamental Indexing Faces Challenge," TheStreet.com, Jun. 13, 2007.
Barry Critchley, "You learn something new every day: New tricks to make the market work better," National Post (Canada), Jun. 15, 2007.
Pauline Skypala, "Spa ETF's Multi-launch set to expand range of ETF trackers," Financial Times, Jun. 18, 2007.
Kathie O'Donnell, "Fundamentals-based index fund has goods, struggles for attention," Investment News, Jun. 18, 2007.
Kathie O'Donnell, "Genworth Financial's AssetMark Introduces New Fundamental Index™ Funds," Press Release, Jun. 18, 2007.
Maureen Darrigo, "Market Pulse: BNN Market Call—Som Seif," The Globe & Mail (Toronto), Jun. 19, 2007.
Maureen Darrigo, "PowerShares to Launch Four International ETFs Based on FTSE RAFI™ Indexes at the New York Stock Exchange Jun. 25, 2007," Press Release, Jun. 19, 2007.
Jesse Emspak, "Exchange-Traded Funds: PowerShares Launches Foreign Index Funds," Investor's Business Daily, Jun. 20, 2007.
Ellen Roseman, "Canadians spread cash worldwide," Toronto Star, Jun. 20, 2007.
John Kimelman, "Sampling the ETF Smorgasbord," Barron's, Jun. 22, 2007.
Kevin Bailey, "New Funds Are Old Hat," Herald Sun (Australia), Jun. 25, 2007.
Matthew Hougan, "International RAFI ETFs List on ARCA," IndexUniverse.com, Jun. 25, 2007.
Jonathan Chevreau, "One In Ten Licensed For ETF Run-Up," National Post (Canada), Jun. 25, 2007.
Jonathan Chevreau, "PowerShares Launches Four New FTSE RAFI™ International ETFs on NYSE Arca," Press Release, Jun. 25, 2007.
Jonathan Chevreau, "Hirings: AssetMark Investment Services," Pensions&Investments Online, Jun. 25, 2007.
Jonathan Chevreau, "New U.S. ETFs include Sudan-Free social ETF," Reuters, Jun. 25, 2007.
Jonathan Chevreau, "PowerShares Expands Its Global ETF Initiative Strategy at NYSE," Press Release, Jun. 25, 2007.
Tim Middleton, "Don't follow the dumb money," MSN Money, Jun. 26, 2007.
Matthew Hougan, "ETF Watch: Jun. 7-25," IndexUniverse.com, Jun. 27, 2007.
Rob Wherry, "New From Morningstar's Conference," SmartMoney.com, Jun. 28, 2007.
Mark Salzinger, "Navigating Choppier Waters With ETFs, Funds & Stocks," No-Load Fund Investor, Jul. 1, 2007.
John Spence, "Tempest in an index fund: Robert Arnott and John Bogle clash over best indexing strategy," MarketWatch, Jul. 1, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
Trang Ho, "Foreign ETF Assets Up 24% So Far This Year," Investor's Business Daily, Jul. 11, 2007.
Charles Paikert, "Index battle (p. 2)," Investment News, Jul. 16, 2007.
Sonya Morris, "Measuring the Market's Value," Morningstar, Jul. 16, 2007.
Gastineau, Gary L., "The Cutting Edge," IndexUniverse.com, Jan. 2007.
International Search Report issued in related PCT/US2005/002345 mailed Dec. 19, 2006.
"Optimal Value-Weighted Portfolios," Economist's View: Value Weighted Portfolios, Jun. 14, 2006.
"Stock Market Perspective: Better Ways to Index?" http://www.pankin.com/persp062.pdf.
Chernoff, Joel, "A New Look in Benchmarks: Consultant Devises Alternative Based on Country Wealth," Pensions & Investments Online, Issue Date: Apr. 14, 1997.
Raub, David, "Rethinking Indexing," www.NorthBaybiz.com, Issue: Apr. 2006.
Author Unknown, "Methodology for the Management of the FTSE RAFI (Research Affiliates Fundamental Index) Index Series," The FTSE RAFI Index Series Ground Rules, Version 1.1, Dec. 2005.
Serwer, Andy, "Brains, Pluck, and Bucks," CNNMoney.com/magazines/fortune/fortune_archives, Jul. 3, 2006.
Arnott, Robert, "Retrospectives on Selected Fundamental Index Strategies," Research Affiliates, Dec. 2005.
Treynor, Jack, "Perspectives; Why Market-Valuation-Indifferent Indexing Works," Financial Analysts Journal, vol. 61, No. 5, CFA Institute, Sep./Oct. 2005.

Arnott, Rob and Hennessy, David, "Research Affiliates Fundamental Index," Feb. 2006.
Author Unknown, "PowerShares FTSE RAFI US 1000 Portfolio," www.powershares.com, PRF Facts, Sep. 30, 2005.
Markowitz, Harry M., "Market Efficiency: A Theoretical Distinction and So What?" www.cfapubs.org, Financial Analysts Journal, Reflections, CFA Institute, Sep./Oct. 2005. pp. 17-30.
Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005.
Hsu, Jason C. and Campollo, Carmen, "New Frontiers In Index Investing," Journal of Indexes, Jan./Feb. 2006, pp. 32-34, 36, 37, 58.
Makepeace, Mark, "FTSE: Coming to America," Journal of Indexes, Jan./Feb. 2006, pp. 38-39.
Blanchett, David, "Building The Best Index; Equal-Weighting vs. Market Capitalization," Journal of Indexes, Jan./Feb. 2006, pp. 40-42.
Gastineau, Gary, "Is Indexing Ready for the Challenges of the 21st Century?", Journal of Indexes. The Cutting Edge, Mar./Apr. 2003, pp. 32-35.
Author Unknown, "William F. Sharpe Awards—Plus Editorial Beard Meeting Excerpts," Journal of Indexes, Mar./Apr. 2006, pp. 36-41.
Author Unknown, "FTSE/RAFI PowerShares ETF Launches on Big Board," Journal of Indexes, Mar./Apr. 2006, pp. 51-52.
Leake, Thomas and Morris, David, "Where Next For the Index Business Model? Bringing Low Cost to the World of Active Management," Journal of Indexes, May/Jun. 2006, pp. 22-26.
Schoenfeld, Steven A. and Ginis, Robert E., "Worth Weighting For? A Survey and Critique of Alternatively Weighted Indexes," Journal of Indexes, May/Jun. 2006, pp. 10-21.
Author Unknown, "CalPERS Goes Fundamental," News, Indexing Developments, Journal of Indexes, May/Jun. 2006, p. 52.
Arnott, Robert D., "What Cost "Noise"?" Financial Analysts Journal, Editor's Corner, CFA Institute, Mar./Apr. 2005, pp. 10-14.
Author Unknown, "Dividend Party Goes Global," Journal of Indexes, Mar./Apr. 2006, p. 52.
DRM Portion of CalPERS' Presentation Given on Jan. 12, 2001, 4 pages.
D. Morris, AIMIC Press Conference Presentation—Tokyo, May 29, 1998 (10 pages).
J. Chernoff, "A New Look in Benchmarks: Consultant Devises Alternative Based on Country Wealth," Pensions & Investments Online (pionline.com), Apr. 14, 1997 (4 pages).
"Index Industry Leaders . . . In Their Own Words," Journal of Indexes, Sep./Oct. 2006, pp. 10-21.
Office Action from related U.S. Appl. No. 10/961,404 mailed Mar. 13, 2008.
Bazley, John D., Financial Accounting Concepts and Uses, PWS-Kent Publishing Company, 1988, p. 4.
International Search Report and Written Opinion from PCT/US2008/003762 mailed Sep. 10, 2008.
International Search Report and Written Opinion issued in PCT/US2007/018534 mailed Sep. 17, 2008.
Office Action issued Oct. 3, 2008 in related U.S. Appl. No. 10/159,610.
Arnott, et al., "Fundamental Indexation," Financial Analysis Journal, vol. 61, No. 2, pp. 83-89, Mar./Apr. 2005.
Arnott et al., "Redefining Indexation," Research Affiliates, LLC, pp. 1-24, 2004.
Author Unknown, "MSCI Methodology Book: MSCI Global Value and Growth Index Series," Morgan Stanley Capital International Inc., pp. 1, 2, 8-11, 2003.
Author Unknown, "About the America's Fastest Growing companies Family of Stock Indexes," America's Fastest Growing Companies, Jan. 2002.
Author Unknown, "America's Fastest Growing Companies Index," America's Fastest Growing Companies, Jan. 2002.
Author Unknown, "America's Fastest Growing Companies Midcap Index," America's Fastest Growing Companies, Jan. 2002.
Author Unknown, "America's Fastest Growing Companies LargeCap Index," America's Fastest Growing Companies, Jan. 2002.
Author Unknown, "America's Fastest Growing Companies Total Growth Index," America's Fastest Growing Companies, Jan. 2002.
Author Unknown, "CME: Goldman Sachs Commodity Index (GSCI) to include CME Feeder Cattle in 2002 Index Weighting," Nov. 7, 2001.
Warren Buffet, "Letter to Berkshire Hathaway, Inc. Shareholders," pp. 3, 16, 19, 1999.

* cited by examiner

NON-CAPITALIZATION WEIGHTED INDEXING SYSTEM, METHOD AND COMPUTER PROGRAM PRODUCT

CROSS-REFERENCE TO RELATED APPLICATION

The present application is a continuation-in-part of U.S. patent application Ser. No. 10/961,404, entitled "Non-Capitalization Weighted Fundamental Indexing System, Method and Computer Program Product," to Arnott, filed Oct. 12, 2004, which claims priority to U.S. Provisional Patent Application No. 60/541,733, entitled "Securities Indexing," to Arnott, filed Feb. 4, 2004, both of which are of common assignee to the present invention, the contents of both of which are incorporated herein by reference in their entirety.

The present application is also a continuation-in-part of U.S. patent application Ser. No. 10/159,610, entitled "Fundamental Stock Market Index and Index Fund or Funds," filed Jun. 3, 2002, of common assignee to the present invention, the contents of which is incorporated herein by reference in its entirety.

BACKGROUND OF THE INVENTION

1. Field of the Invention

This invention pertains generally to securities investing and more specifically to construction and use of passive portfolios and indexes.

2. Related Art

Conventionally, there are various broad categories of securities portfolio management. One conventional securities portfolio management category is active management wherein the securities are selected for a portfolio individually based on economic, financial, credit, and/or business analysis; on technical trends; on cyclical patterns; etc. Another conventional category is passive management, also called indexing, wherein the securities in a portfolio duplicate those that make up an index. The securities in a passively managed portfolio are conventionally weighted by relative market capitalization weighting or equal weighting. Another middle ground conventional category of securities portfolio management is called enhanced indexing, in which a portfolio's characteristics, performance and holdings are substantially dominated by the characteristics, performance and holdings of the index, albeit with modest active management departures from the index.

The present invention relates generally to the passive and enhanced indexing categories of portfolio management. A securities market index, by intent, reflects an entire market or a segment of a market. A passive portfolio based on an index may also reflect the entire market or segment. Often every security in an index is held in the passive portfolio. Sometimes statistical modeling is used to create a portfolio that duplicates the profile, risk characteristics, performance characteristics, and securities weightings of an index, without actually owning every security included in the index. (Examples could be portfolios based on the Wilshire 5000 Equity Index or on the Lehman Aggregate Bond Index.) Sometimes statistical modeling is used to create the index itself such that it duplicates the profile, risk characteristics, performance characteristics, and securities weightings of an entire class of securities. (The Lehman Aggregate Bond Index is an example of this practice.)

Indexes are generally all-inclusive of the securities within their defined markets or market segments. In most cases indexes may include each security in the proportion that its market capitalization bears to the total market capitalization of all of the included securities. The only common exceptions to market capitalization weighting are equal weighting of the included securities (for example the Value Line index or the Standard & Poors 500 Equal Weighted Stock Index, which includes all of the stocks in the S&P 500 on a list basis; each stock given equal weighting as of a designated day each year) and share price weighting, in which share prices are simply added together and divided by some simple divisor (for example, the Dow Jones Industrial Average). Conventionally, passive portfolios are built based on an index weighted using one of market capitalization weighting, equal weighting, and share price weighting.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Advantages of passive investing include: a low trading cost of maintaining a portfolio that has turnover only when an index is reconstituted, typically once a year; a low management cost of a portfolio that requires no analysis of individual securities; and no chance of the portfolio suffering a loss—relative to the market or market segment the index reflects—because of misjudgments in individual securities selection.

Advantages of using market capitalization weighting as the basis for a passive portfolio include that the index (and therefore a portfolio built on it) remains continually 'in balance' as market prices for the included securities change, and that the portfolio performance participates in (i.e., reflects) that of the securities market or market segment included in the index.

The disadvantages of market capitalization weighting passive indexes, which can be substantial, center on the fact that any under-valued securities are underweighted in the index and related portfolios, while any over-valued securities are over weighted. Also, the portfolio based on market capitalization weighting follows every market (or segment) bubble up and every market crash down. Finally, in general, portfolio securities selection is not based on a criteria that reflects a better opportunity for appreciation than that of the market or market segment overall.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Price or market capitalization based indices can contribute to a 'herding' behavior on the behalf of investors by effectively compelling any of the funds that attempt to follow these indices to have a larger weighting in shares as their price goes up and a lower weighting in shares that have declined in price. This creates unnecessary volatility, which is not in the interests of most investors. It may also lead to investment returns that have had to absorb the phenomenon of having to repeatedly increase weightings in shares after they have risen and reduce weightings in them after they have fallen.

SUMMARY OF THE INVENTION

An exemplary embodiment of the present invention is directed to a new method, system and computer program product for passive investing that is based on indexes which are built with metrics other than market capitalization weighting, share price weighting or equal weighting. Among these metrics are various financial data of the company issuing securities, including but not limited to book value, sales, revenue, earnings, earnings per share, income, income growth rate, dividends, dividends per share, earnings before interest, tax, depreciation and amortization, etc. In another exemplary embodiment, other nonfinancial and non-market capitalization metrics can be used as the basis for compiling an index, such as, e.g., but not limited to, an index of companies with chief executive officers (CEOs) having graduated from a particular university.

A common element included in an exemplary embodiment of the present invention, which is entirely missing from conventionally available forms of index construction, is that the indexes of the present invention are "valuation-indifferent." That is, conventional indexes do not take account of classical valuation ratios, which causes the conventional indexes to create a natural tendency to over-weight the over-valued and under-weight the under-valued securities in the conventional indexes and portfolios based on them. While this cause also holds true for equal weighting, we exclude that as an already-extant (and trivial) exception.

The use of these non-market capitalization metrics according to the exemplary embodiment of the present invention, allows the construction of indexes and resulting passive portfolios that better reflect the economic scale and/or long-term growth potential of the individual securities within a market or market segment than do conventional capitalization weighting, share price weighting, or equal weighting. The non-market capitalization metrics according to an exemplary embodiment of the present invention, allow construction of indexes and resulting passive portfolios that offer to an investor who wishes to participate in a market or market segment a choice of passive portfolio alternatives with different risk characteristics. The indexes and portfolios based on them according to the exemplary embodiment of the present invention, also provide these additional advantages while maintaining the conventional benefits of passive investing. In historical testing, these non-market capitalization metrics are found to outperform the conventional capitalization-weighted indexes over extended periods of time, with similar or lower portfolio risk.

Overall, the availability of non-market capitalization indexes, and the passive and enhanced index portfolios based on them, have the potential to reduce investment costs through more widespread use of low-cost passive and enhanced-index investing. The present invention has the potential to improve investment returns versus the securities markets through the use of a securities weighting framework which is not subject to a natural tendency to overemphasize over-valued securities and underemphasize under-valued securities. The present invention also has the potential to reduce portfolio volatility through the use of securities weighting criteria that are less reflective of 'irrational exuberance.' An exemplary embodiment of the present invention also has the potential to offer 'customized' passive portfolios as each metric may have its own specific performance and risk characteristics.

An exemplary embodiment of the present invention sets forth a system, method, and computer program product for constructing a non-capitalization weighted portfolio of assets. In an exemplary embodiment, the method may include: (a) gathering data about a plurality of assets; (b) selecting a plurality of assets to create the index of assets; and (c) weighting each of the plurality of assets selected in the index based on an objective measure of scale of each of the plurality of assets, wherein the weighting may include: (i) weighting at least one of the plurality of assets; and (ii) weighting other than weighting based on market capitalization, equal weighting, and/or share price weighting.

In one exemplary embodiment, (c) may include weighting each of the plurality of assets, where each of the assets may include a stock; a commodity; a futures contract; a bond; a mutual fund; a hedge fund; a fund of funds; an exchange traded fund (ETF); a derivative; or a negative weighting on any asset.

In one exemplary embodiment, (c) may include weighting each of the plurality of assets, where each of the assets may include a stock.

In one exemplary embodiment, (c) may include weighting each of the plurality of assets, where each of the assets may include a commodity.

In one exemplary embodiment, (c) may include weighting each of the plurality of assets, where each of the assets may include a futures contract.

In one exemplary embodiment, (c) may include weighting each of the plurality of assets, wherein each of the assets may include a bond.

In one exemplary embodiment, (c) may include weighting each of the plurality of assets, where each of the assets may include a mutual fund.

In one exemplary embodiment, (c) may include weighting each of the plurality of assets, where each of the assets may include a hedge fund.

In one exemplary embodiment, (c) may include weighting each of the plurality of assets, where each of the assets may include a fund of funds.

In one exemplary embodiment, (c) may include weighting each of the plurality of assets, where each of the assets may include an exchange traded fund (ETF).

In one exemplary embodiment, (c) may include weighting each of the plurality of assets, where each of the assets may include a derivative.

In one exemplary embodiment, (c) may include a negative weighting on any asset.

In one exemplary embodiment, the negative weighting may be performed for purposes of establishing, or measuring, performance for any security, a portfolio of assets, a hedge fund, and/or a long/short position.

In one exemplary embodiment, (c) may include weighting based on the objective measure of scale, where the objective measure of scale may include a measure of company size associated with each of the plurality of assets.

In one exemplary embodiment, the measure of company size may include one or more of: gross revenue, sales, income, earnings before interest and tax (EBIT), earnings before interest, taxes, depreciation and amortization (EBITDA), number of employees, book value, assets, liabilities, and/or net worth.

In one exemplary embodiment, (c) may include weighting based on the objective measure of scale, where the objective measure of scale includes a measure relating to an underlying asset itself.

In one exemplary embodiment, the asset may include a municipality, a municipality issuing bonds, or a commodity.

In one exemplary embodiment, the objective measure of scale associated with the asset may include one or more of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, tax rate, liquidation value of company, capitalization of cash, capitalization of earnings, capitalization of revenue, cash flow, and/or future value of expected cash flow.

In one exemplary embodiment, (c) may include weighting each of the assets in the index based on the objective measure of scale, where the objective measure may include a ratio of any combination of the objective measures of scale of the asset other than ratios based on weighting the assets based on market capitalization, equal weighting, or share-price weighting.

In one exemplary embodiment, the ratio of any combination of the objective measures of scale may include one or more of: current ratio, debt ratio, overhead expense as a percent of sales, and/or debt service burden ratio.

In one exemplary embodiment, the objective measure of scale may include a demographic measure of the asset.

In one exemplary embodiment, the demographic measure of scale may include one or more of: employees, floor space, office space, location, and/or other demographics of an asset.

In one exemplary embodiment, the measure of company size may include one or more demographic measure of the asset.

In one exemplary embodiment, the demographic measure of the asset may include one or more of a non-financial metric, a non-market related metric, a number of employees, floor space, office space, and/or other demographics of the asset.

In one exemplary embodiment, (c) may include weighting based on the objective measure of scale, where the objective measure of scale may include a geographic metric.

In one exemplary embodiment, the geographic metric may include a geographic metric other than gross domestic product (GDP) weighting.

In one exemplary embodiment, the method may include a passive investing method that may include: constructing the portfolio of assets according to the index.

In one exemplary embodiment, the portfolio of assets may include one or more of: a fund; a mutual fund; a fund of funds; an asset account; an exchange traded fund (ETF); a separate account, a pooled trust; and/or a limited partnership.

In one exemplary embodiment, the method may further include: selecting a plurality of assets for trading according to the index; and trading one or more of said plurality of assets based on said weighting of the index.

In one exemplary embodiment, the trading may include: rebalancing the portfolio based on the index.

In one exemplary embodiment, rebalancing may include: rebalancing on a periodic basis.

In one exemplary embodiment, rebalancing may include: rebalancing based on the assets reaching a threshold.

In one exemplary embodiment, the method may further include applying rules associated with the index.

In one exemplary embodiment, the method of constructing the non-market capitalization weighted portfolio may be used for one or more of: investment management, and/or investment portfolio benchmarking.

In one exemplary embodiment, the method may include an enhanced index investing method. The method may include constructing the portfolio of assets in a fashion in which at least one of holdings, performance, or characteristics, are substantially similar to the index.

In one exemplary embodiment, the method may be a computer-implemented method and (a) may include: gathering data using computerized databases.

In one exemplary embodiment, (c) may include weighting based on a non-market capitalization financial metric associated with each of the plurality of assets, and a non-financial metric associated with each of said plurality of assets.

In another exemplary embodiment, a system for constructing a non-capitalization weighted portfolio of assets may include: means for gathering data about a plurality of assets; means for selecting a plurality of assets to create the index of assets; and weighting means for weighting each of said plurality of assets selected in the index based on an objective measure of scale of said each of said plurality of assets, wherein said weighting means may include: means for weighting at least one of said plurality of assets; and means for weighting other than weighting based on at least one of market capitalization, equal weighting, or share price weighting.

In yet another exemplary embodiment, a non-capitalization weighted portfolio of assets construction system, may include: a processor adapted to gather data about a plurality of assets; adapted to select a plurality of assets to create the index of assets; adapted to weight each of the plurality of assets selected in the index based on an objective measure of scale of the each of said plurality of assets; adapted to weight at least one of the plurality of assets; and adapted to weight other than based on at least one of market capitalization, equal weighting, or share price weighting.

In another exemplary embodiment, a machine readable medium that provides instructions which when executed by a computing platform, cause the computing platform to perform operations may include a method of constructing a non-capitalization weighted portfolio of assets, the method may include: (a) gathering data about a plurality of assets; (b) selecting a plurality of assets to create the index of assets; and (c) weighting each of said plurality of assets selected in the index based on an objective measure of scale of said each of said plurality of assets, wherein said weighting comprises: (i)

weighting at least one of said plurality of assets; and (ii) weighting other than weighting based on at least one of market capitalization, equal weighting, or share price weighting.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EXEMPLARY EMBODIMENTS OF THE PRESENT INVENTION

Various exemplary embodiments of the invention are discussed in detail below including a preferred embodiment. While specific implementations are discussed, it should be understood that this is done for illustration purposes only. A person skilled in the relevant art can recognize that other components and configurations may be used without parting from the spirit and scope of the invention.

Figure 1:
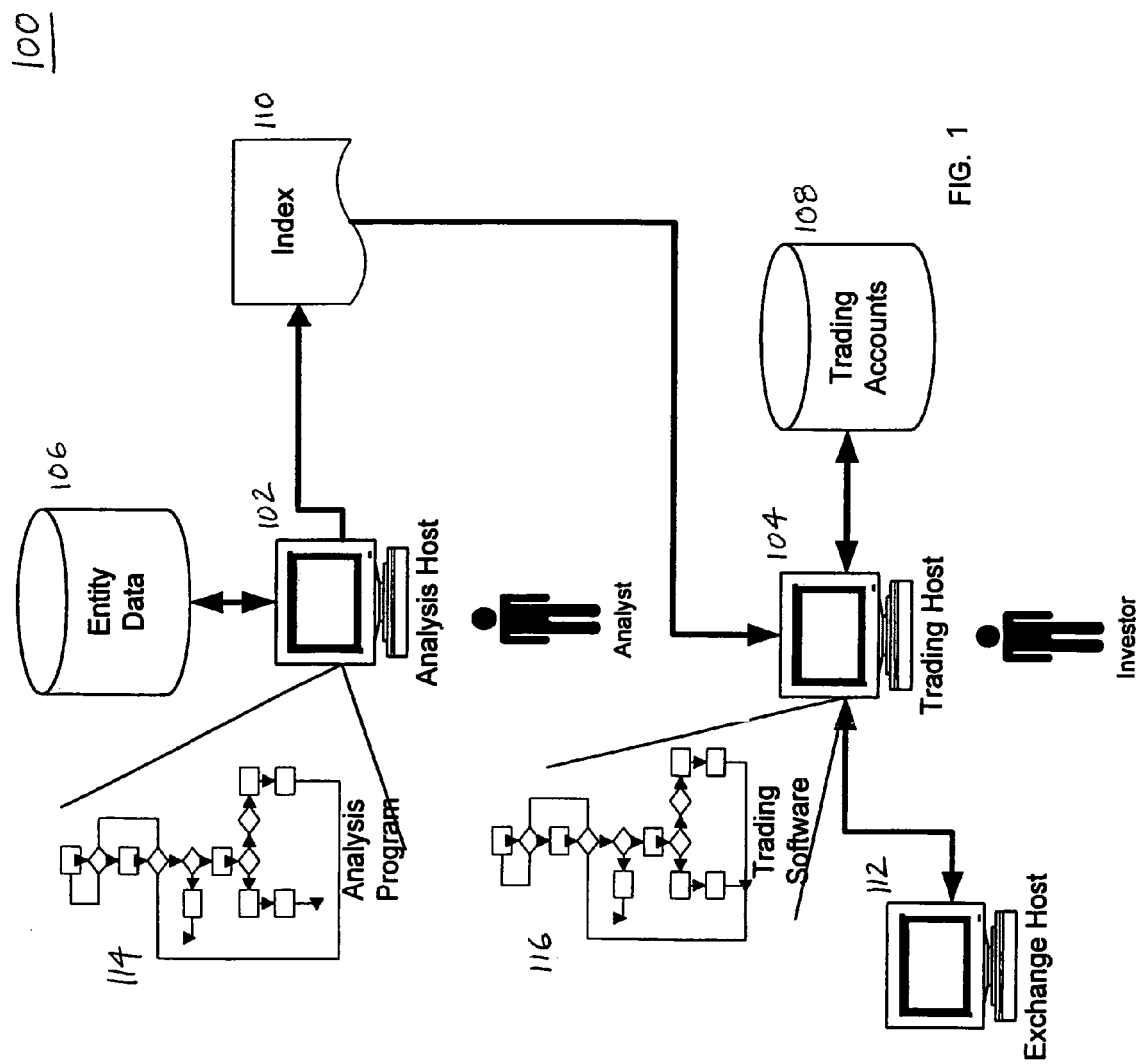
FIG. 1 is a deployment diagram of an index generation and use process in accordance with an exemplary embodiment of the present invention.

FIG. 1 depicts an exemplary deployment diagram of an index generation and use process in accordance with an exemplary embodiment of the present invention. According to the exemplary embodiment, an analyst may use a computer system to generate an index. The analyst may do so by using analysis software to examine data about entities offering different kinds of securities that may be traded by investors. An example of an entity that may be offering securities may be a publicly held company whose shares trade on an exchange. However, the present invention also applies to any entity that may have any type of security that may be traded where information about the entity and/or its security is available (or capable of being made available) for analysis.

In an exemplary embodiment, once an index has been generated by an analyst using the entity date, the index may be used to build investment portfolios. An investor, advisor, manager or broker may then manage the purchased securities as a mutual fund for a plurality of individual and institutional investors. Alternatively, the purchased securities may be managed for one or more investors. In the latter case, securities may be purchased based on the index for inclusion in an individual or an institutional investor's portfolio.

Figure 2:
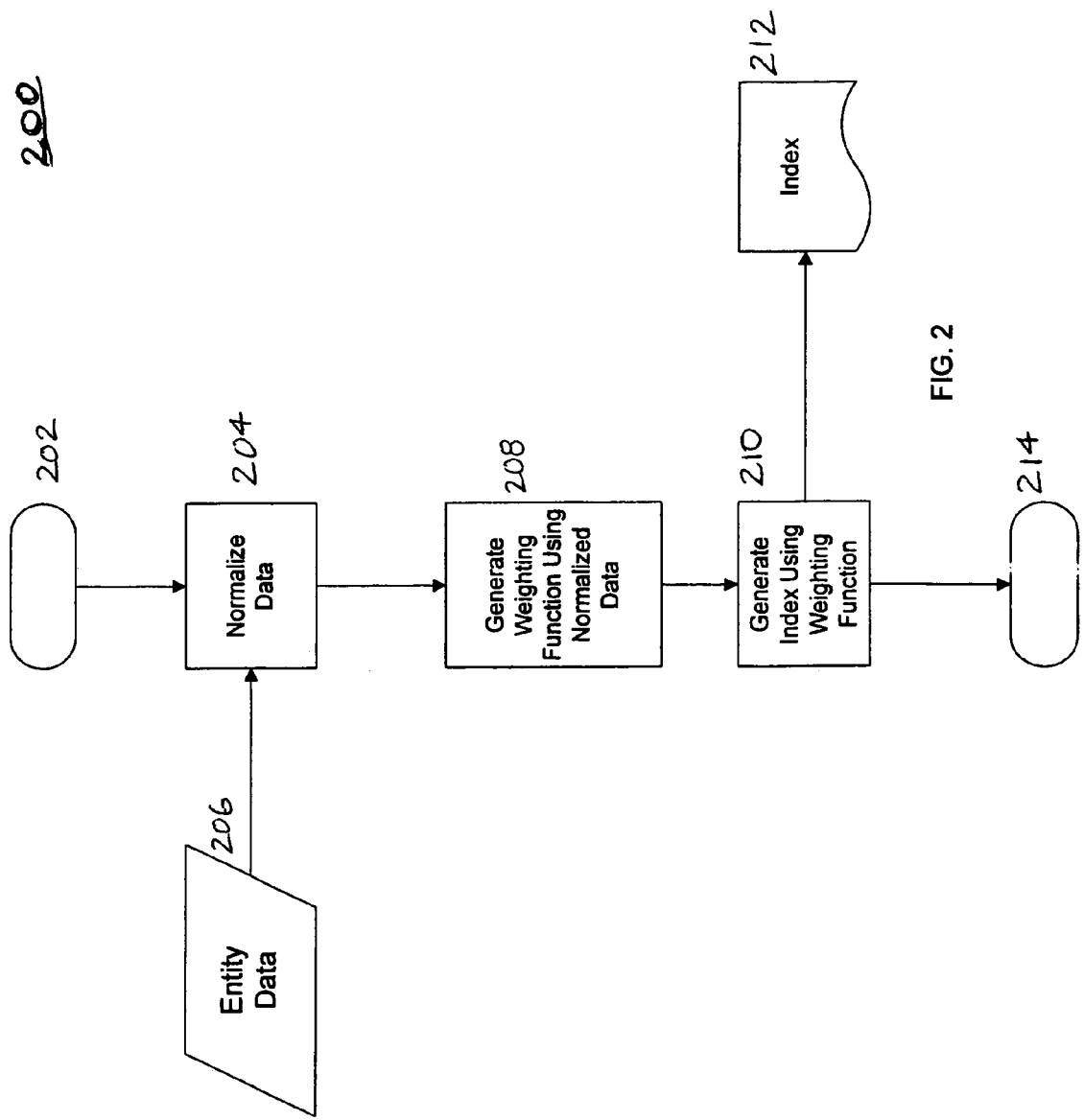
FIG. 2 is a process flow diagram of an index generation process in accordance with an exemplary embodiment of the present invention.

FIG. 2 depicts an exemplary process flow diagram of an index generation process in accordance with an exemplary embodiment of the present invention. In an exemplary embodiment, to generate an index, an analyst using analysis software may access entity data about various entities that have securities that are traded. For example, publicly traded companies must disclose information about certain financial aspects of their operations. This information may be aggregated for a plurality of entities. Market sectors and corresponding indices may then be identified and generated using the aggregate data.

In slightly more detail, an index may be generated by normalizing entity data for a particular non-market capitalization metric. The normalized entity data may be used to generate a weighting function describing the contribution of each entity to a business sector as defined by the metric, in an exemplary embodiment. An index may be generated using the weighting function. Once an index is generated, according to an exemplary embodiment, the index may be used to track the business sector defined by the metric or to create a portfolio of securities offered by the entities whose information was used to generate the index.

For example, in an exemplary embodiment of the invention a method of constructing a non-capitalization weighted portfolio of assets may include, e.g., gathering data about various assets; selecting a group of assets to create the index of assets; and weighting each of the group of assets selected in the index based on an objective measure of scale of each member of the group of assets, where the weighting may include weighting all or a subset of the group of assets, and weighting based on other than market capitalization, equal weighting, or share price weighting.

In one exemplary embodiment, the weighting of each member of the group of assets, may include weighting assets of any of various types. Examples of various types of assets may include, e.g., but not limited to, a stock type; a commodity type; a futures contract type; a bond type; a mutual fund type; a hedge fund type; a fund of funds type; an exchange traded fund (ETF) type; and a derivative type assets. The weighting may also include, e.g., but not limited to, a negative weighting on any of the various types of assets.

According to exemplary embodiments of the present invention, the index may be weighted based on an objective measure of scale, where the objective measure of scale may include a measure relating to an underlying asset itself. The asset may include a municipality, a municipality issuing bonds, or a commodity. An objective measure of scale associated with the asset may include any combination of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, tax rate, liquidation value of company, capitalization of cash, capitalization of earnings, capitalization of revenue, cash flow, and/or future value of expected cash flow.

Ratios too may be used. In an exemplary embodiment, the weighting of assets in the index based on objective measures of scale, may include a ratio of any combination of the objective measures of scale of the asset other than ratios based on weighting the assets based on market capitalization, equal weighting, or share-price weighting. For example, the ratio of any combination of the objective measures of scale may include, e.g., but not limited to, current ratio, debt ratio, overhead expense as a percent of sales, or debt service burden ratio.

In an exemplary embodiment, the portfolio of assets may include, e.g., but not limited to, one or more of, a fund; a mutual fund; a fund of funds; an asset account; an exchange traded fund (ETF); a separate account, a pooled trust; or a limited partnership.

In an exemplary embodiment, a measure of company size may include one of, or a combination of one or more of gross revenue, sales, income, earnings before interest and tax (EBIT), earnings before interest, taxes, depreciation and amortization (EBITDA), number of employees, book value, assets, liabilities, or net worth.

In one exemplary embodiment, the measure of company size may include a demographic measure of the asset. The demographic measure of the asset may include, e.g., one of, or any combination of one or more of a non-financial metric, a non-market related metric, a number of employees, floor space, office space, or other demographics of the asset.

In an exemplary embodiment, weighting may be based on the objective measure of scale, where the measure may include a geographic metric. The geographic metric in an exemplary embodiment may include a geographic metric other than gross domestic product (GDP) weighting.

Figure 3:
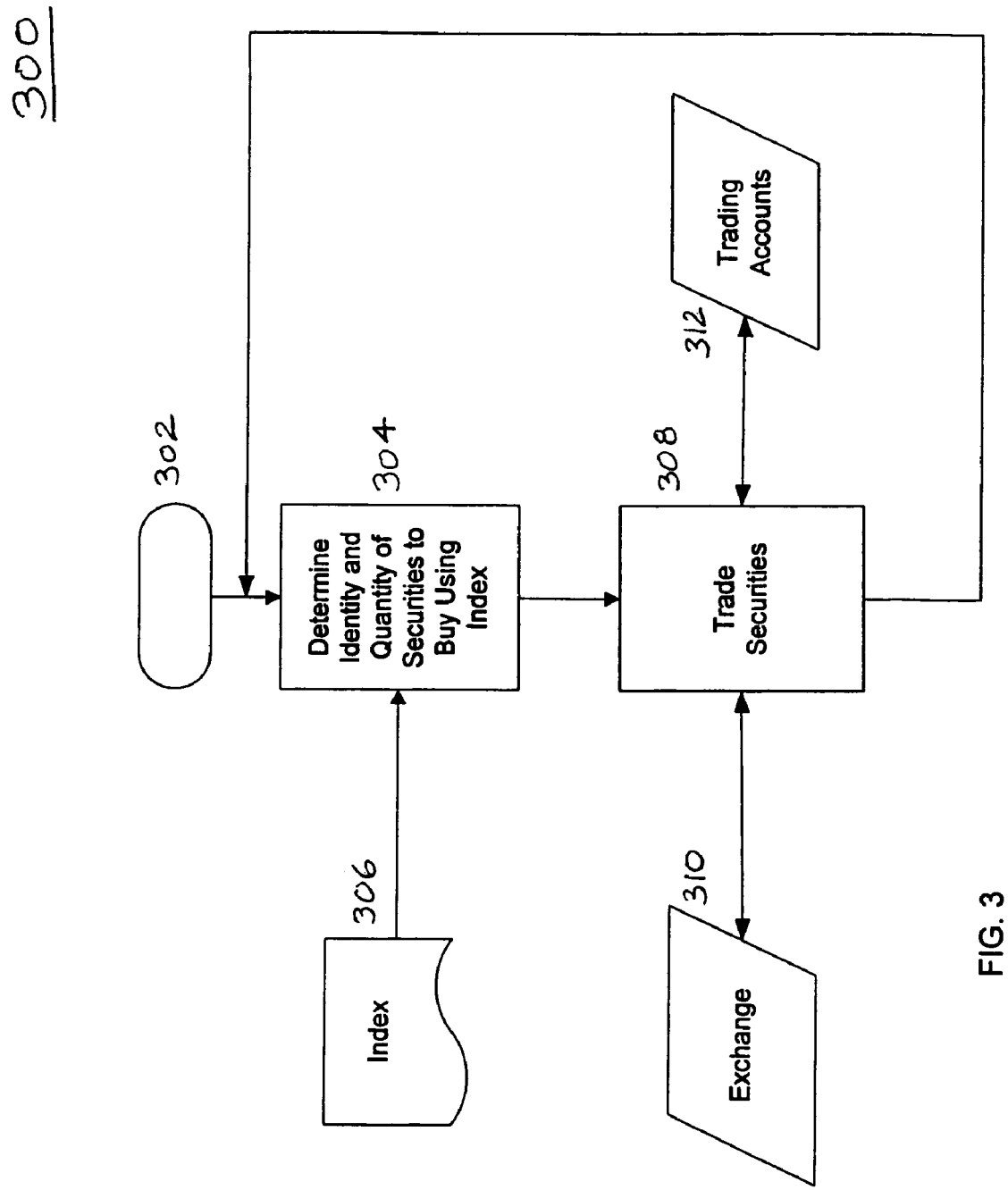
FIG. 3 is a process flow diagram of an index use process in accordance with an exemplary embodiment of the present invention.

FIG. 3 depicts an exemplary process flow diagram of an index use process in accordance with an exemplary embodiment of the present invention. An index may be received from an index generation process and may be used to determine the identity and quantity of securities to purchase for a portfolio, according to an exemplary embodiment. The securities may be purchased from an exchange or other market and may be held on account for an investor or group of investors. The index may be updated on, e.g., but not limited to, a periodic basis and may be used as a basis to rebalance the portfolio, according to an exemplary embodiment. According to another exemplary embodiment, the portfolio can be rebalanced when, e.g., a pre-determined threshold is reached. In this way, a portfolio may be created and maintained based on a non-market capitalization index.

Rebalancing can be based on assets reaching a threshold condition or value. For example, but not limited to, rebalancing may occur upon reaching a threshold such as, e.g., 'when the portfolio of assets increases in market value by 20%,' or 'when the assets on a sub-category within the portfolio exceed 32% of the size of the portfolio,' or 'when a U.S. President is elected from a different party than the incumbent,' etc.

The present invention, in an exemplary embodiment may be used the non-market capitalization weighted portfolio may be used for investment management, or investment portfolio benchmarking.

An exemplary embodiment of the invention may be implemented on a computing device(s), processor(s), computer(s) and/or communications device(s).

The computer, in an exemplary embodiment, may comprise one or more central processing units (CPUs) or processors, which may be coupled to a bus. The processor may, e.g., access main memory via the bus. The computer may be coupled to an input/output (I/O) subsystem such as, e.g., but not limited to, a network interface card (NIC), or a modem for access to a network. The computer may also be coupled to a secondary memory directly via bus, or via a main memory, for example. Secondary memory may include, e.g., but not limited to, a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), or a magneto optical device. Another type of secondary memory may include a removable disk storage device, which may be used in conjunction with a removable storage medium, such as, e.g. a CD-ROM, or a floppy diskette. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Another exemplary embodiment of the present invention is a Fundamental Stock Market Index and Index Fund or Funds.

This embodiment utilizes a new series of fundamental stock market indices in which the index weightings are determined by company fundamentals such as: the relative size of a company's profits, or its pre exceptional profits, or sales, or return on investment or any fundamental accounting item, or ratio, may help to address some of the issues raised above. An index that determines its weightings based on company fundamentals, rather than the share price, or market capitalization, has a stabilizing element within it that can help to remove excess volatility generated by indices constructed on the basis of price or market capitalization alone. Over the medium to longer term, such fundamentally based indices have the potential to outperform price or market capitalization-based indices, and may do so with less volatility.

The inventive method creates a new class of stock market indices and index funds that may be implemented on, but not limited to, a computing device or a processor, or as a computer software or hardware, or as an algorithm. This new class of stock market indices bases its weightings on the fundamentals of the companies that make up that index. One possible version of a fundamentally based stock market index would be an index that is based on the relative size of a sample of the companies' pre exceptional profits. If the chosen sample of companies was determined to be one hundred and the fundamental criteria that the index manager decided to use was to be 'largest pre exceptional profits,' then the index may contain the one hundred largest companies as defined by the size of their pre exceptional profits. As an example, if the total pre exceptional profits of the largest one hundred companies, as measured by their pre exceptional profits, was 100 pounds in a defined time period (such as a quarter or year) and in the same time period the pre exceptional profits of theoretical company 'A' were 2 pounds, then theoretical company A would be allocated a 2% weighting in the fundamental index. If theoretical company B had pre exceptional profits of 1.5 pounds in over the same time period then it would have a weighting of 1.5% in the fundamental index.

The index weightings are managed based on how the fundamentals of the companies within, or outside, the chosen index sample change. As an example, the index manager could choose to rebalance the weightings either quarterly, as company pre exceptional profits change, or on an annual basis and enter their choice into a computing device. If, for instance, by the time of the next rebalancing period the total pre exceptional profits of the largest one hundred companies, as measured by their pre exceptional profits, had grown to 120 pounds, and theoretical company A now had pre exceptional profits of 1.2 pounds, the computing device would calculate the weighting of company in the fundamental index down to 1% from 2% in the previous period. Creating such fundamental indices gives an investor the opportunity to follow, or invest, passively in an index which is anchored to the economic realities of the companies within it. This new fundamental index construction technique by a computing device produces an index and related index fund products with increased stability and with increased economically rational as compared with known methods of investing.

In one exemplary embodiment, a computing device creates a fundamental stock market index by using any of the fundamental data points regarding a company or a group of companies that can be found in a company's annual report and accounts. In one exemplary embodiment, the computing device creates an index of companies based on the relative size of the companies sales, assets, profits, cash flow or the shareholders equity. In addition, the computing device can also create the fundamental index by using a ratio of any of the data concerning a company or group of companies that is contained in a company report and accounts. In one exemplary embodiment, this could include the relative size of the return on assets of a selection of companies, their return on investment, or their return on capital compared to their cost of capital.

Once the index manager has decided and entered which fundamental criteria to use and how many constituents the manager decides that he or she wants to include in the index, the computing device creates the index in the following way. If, for example, the index manager decides to construct a fundamental stock market index of one hundred constituent members and decides to use pre exceptional profit as the chosen fundamental criteria, the computing device creates the index as follows. First, the computing device performs a search to find which are the largest one hundred listed companies as defined by the size of their pre exceptional profits. Once the computing device has identified this information, the computing device is ready to construct the index. Companies are accorded index weightings based on the relative size of their pre exceptional profits. If the combined pre exceptional profits of the one hundred companies is 100 pounds and theoretical company A has pre exceptional profits of 2 pounds, then it would have an index weighting of 2%. Once the one hundred companies had been accorded their weightings, the computing device begins to calculate future index performance as the share prices of the different companies in the index changes from day to day. This may be achieved by assuming a starting value for the index, or index portfolio, and then calculating how each of the index constituents performs going forward.

The computing device may then rebalance the index weightings as the fundamental data points change over time as desired by the investor. For instance, if at the end of the next company reporting season the combined pre exceptional profits of the one hundred largest companies had grown from 100 pounds to 120 pounds and the pre exceptional profits of theoretical company A had declined from 2 pounds to 1.2 pounds, the computing device determines its weighting in the index would decline from 2% in the prior period to 1% in the current period. Also, some of the original companies in the first one hundred may be eliminated from the index if their pre exceptional profits fall below a certain level while new companies that were not in the original sample may be included. The computing device, under the direction of an investor, may choose to rebalance the weightings in the index either as individual companies report their pre exceptional profits on a quarterly basis, or wait until the majority of companies have reported their pre exceptional profits and then adjust them all at once. Also, the computing device, under the direction of an investor, could choose to determine the weightings based on either the total nominal amount of pre exceptional profit each quarter or on a cumulative rolling basis. 1

Constructing a stock market index using fundamental company accounts data or a ratio, or manipulation of that data provides a series of genuine alternatives for investors who want to invest in a passive style while focusing on fundamentals that they believe are important. For instance, an investor may always want to own an index of U.S. or foreign equities that are the largest five hundred companies as measured by sales, or by profits, or by growth in sales, or by return on investment, or any fundamental company accounts data or ratio of that data.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. While this invention has been particularly described and illustrated with reference to a preferred embodiment, it will be understood to those having ordinary skill in the art that changes in the above description or illustrations may be made with respect to formal detail without departing from the spirit and scope of the invention.

What is claimed is:

1. A computer implemented method of constructing an index of assets (I), the method performed by at least one processor operable to perform the method, the method comprising:
    (a) accessing by the at least one processor of one or more databases storing and permitting retrieval of data (D) about a plurality of companies (C) and a plurality of corresponding assets (A) each issued by or having been issued by at least one of the plurality of companies (C);
    (b) receiving by the at least one processor a numerical size (N) of the index of assets (1);
    (c) receiving by the at least one processor at least one objective measure of scale (O) regarding one or more of the plurality of companies (C) associated with said corresponding assets (A);
    (d) retrieving by the at least one processor one or more of said data (D) about a plurality of said companies (C) and said corresponding assets (A);
    (e) selecting by the at least one processor said one or more data (D) to be a quantitative data (Q) reflecting the amount of said at least one objective measure of scale (O) associated with each of said companies (C), wherein said selecting comprises: (i) excluding any of said data (D) regarding the market prices (P) of any of said assets (A); and (ii) excluding any of said data (D) regarding the market capitalization (MC) of any of said companies (C),
    wherein said at least one objective measure of scale (O) comprises a measure of the size (SZ) of each said company (C) associated with each said given asset (A), and
    wherein said measure of the size (SZ) of each said company (C) corresponding to each said asset (A) comprises at least one of:
        gross revenue of a said company (C) associated with a said asset (A),
        sales of a said company (C) associated with a said asset (A),
        income of a said company (C) associated with a said asset (A),
        earnings before interest and tax (EBIT) of a said company (C) associated with a said asset (A),
        earnings before interest, taxes, depreciation and amortization (EBITDA) of a said company (C) associated with a said asset (A),
        number of employees of a said company (C) associated with a said asset (A),
        book value of a said company (C) associated with a said asset (A),
        assets of a said company (C) associated with a said asset (A),
        liabilities of a said company (C) associated with a said asset (A),
        net worth of a said company (C) associated with a said asset (A),
        cashflow of a said company (C) associated with a said asset (A),
        any dividends of a said company (C) associated with a said asset (A),
        an attribute relating to employees of a said company (C) associated with a said asset (A),
        an attribute relating to floor space of a said company (C) associated with a said asset (A),
        an attribute relating to office space of a said company (C) associated with a said asset (A),
        an attribute relating to location of a said company (C) associated with a said asset (A),
        a demographic measure (DM) of a said company (C) associated with a said asset (A), or a measure relating to a demographic attribute of a said company (C) associated with a said asset (A);
    (f) ranking by the at least one processor said companies (C) based upon a said quantitative data (Q) associated with the at least one objective measure of scale (O) of each of said companies (C);
    (g) selecting by the at least one processor said numerical size (N) of the index of assets (I) of the companies (C) having the highest rank of said quantitative data (Q) to comprise the plurality of constituent index assets (IA) exclusively comprising the index of assets (I); and
    (h) calculating by the at least one processor percentage weights for the index of assets (I) to be objective measure of scale weights (OW) exclusive of (i) any of said market prices (P) of any of said assets (A); and (ii) any of said market capitalization (MC) of any of said companies (C), wherein the calculating comprises:
        (i) adding the quantitative data (Q) of each of said at least one objective measure of scale (O) for all of said constituent index assets (IA) to yield a sum total quantitative data (SUMQ) for said at least one objective measure of scale; and
        (ii) dividing a said quantitative data (Q) of a said at least one objective measure of scale (O) for each said constituent index asset (IA) by the sum total quantitative data (SUMQ) to yield the objective measure of scale weight (OW) of each of the constituent index assets (IA) comprising the index of assets (I),
    wherein said at least one objective measure of scale (O) comprises a measure of the size (SZ) of each said company (C) associated with each said given constituent index asset (IA), and
    wherein said measure of the size (SZ) of each said company (C) corresponding to each said constituent index asset (IA) comprises at least one of:
        gross revenue of a said company (C) associated with said constituent index asset (IA),
        sales of a said company (C) associated with said constituent index asset (IA),
        income of a said company (C) associated with said constituent index asset (IA), earnings before interest and tax (EBIT) of a said company (C) associated with said constituent index asset (IA), earnings before interest, taxes, depreciation and amortization (EBITDA) of a said company (C) associated with said constituent index asset (IA), number of employees of a said company (C) associated with said constituent index asset (IA), book value of a said company (C) associated with said constituent index asset (IA), assets of a said company (C) associated with said constituent index asset 0A), liabilities of a said company (C) associated with said constituent index asset (IA), net worth of a said company (C) associated with said constituent index asset (IA), cashflow of a said company (C) associated with said constituent index asset (IA), any dividends of a said company (C) associated with said constituent index asset (IA), an attribute relating to employees of a said company (C) associated with said constituent index asset (IA), an attribute relating to floor space of a said company (C) associated with said constituent index asset (IA), an attribute relating to office space of a said company (C) associated with said constituent index asset (IA), an attribute relating to location of a said company (C) associated with said constituent index asset (IA), a demographic measure (DM) of a said company (C) associated with said constituent index asset (IA), or a measure relating to a demographic attribute of a said company (C) associated with said constituent index asset (IA).

2. The computer implemented method according to claim 1, wherein said each of said assets comprises at least one of a stock (S); a commodity (CO); a futures contract (FC); a bond (B); a municipal bond (MB); a corporate bond (CB); a mutual fund (MF); a hedge fund (HF); a fund of funds (FF); an exchange traded fund (ETF); or a derivative (DE).

3. The computer implemented method according to claim 1, wherein each of said assets comprises a stock (S).

4. The computer implemented method according to claim 1, wherein each of said assets comprises a commodity (CO).

5. The computer implemented method according to claim 1, wherein each of said assets comprises a futures contract (FC).

6. The computer implemented method according to claim 1, wherein each of said assets comprises a bond (B).

7. The computer implemented method according to claim 1, wherein each of said assets comprises a mutual fund (MF).

8. The computer implemented method according to claim 1, wherein each of said assets comprises a hedge fund (HF).

9. The computer implemented method according to claim 1, wherein each of said assets comprises a fund of funds (FF).

10. The computer implemented method according to claim 1, wherein each of said assets comprises an exchange traded fund (ETF).

11. The computer implemented method according to claim 1, wherein each of said assets comprises a derivative (DE).

12. The computer implemented method according to claim 1, wherein said (h) comprises weighting comprising performing a negative weighting on any of said assets (NW).

13. The computer implemented method according to claim 12, wherein said negative weighting (NW) is performed for purposes of at least one of: establishing or measuring performance, for at least one of: any security (S); a portfolio of assets (PA); a hedge fund (HF); or at least one of: a long or a short position.

14. The computer implemented method according to claim 1, wherein said at least one objective measure of scale (O) comprises a measure relating to at least one of an underlying attribute of one or more of the assets (A), or a said company (C) associated with a said asset (A).

15. The computer implemented method according to claim 1, (i) wherein said sales comprises at least one of: total sales, foreign sales, domestic sales, net sales, net revenue or gross sales, (ii) wherein said book value comprises at least one of: a value adjusted for inflation, a value adjusted for replacement or a value adjusted for liquidation value, (iii) wherein the cash flow comprises at least one of: a said entity associated with a said asset, or future value of expected cash flow of a said entity associated with a said asset, and (iv) wherein said at least one objective measure of scale (O) associated with any said assets comprises at least one of:

profitability of a said company associated with a said asset;

profit margin of a said company associated with a said asset;

operating margin of a said company associated with a said asset;

retained earnings of a said company associated with a said asset;

earnings per share of a said company associated with a said asset;

reported profits of a said entity associated with a said asset;

reported pre-exceptional profits of a said entity associated with a said asset;

value of an expected cash flow of a said entity associated with a said asset;

dividends of a said company associated with a said asset;

assets of a said company associated with a said asset;

tangible assets of a said company associated with a said asset;

intangible assets of a said company associated with a said asset;

fixed assets of a said company associated with a said asset;

property of a said company associated with a said asset;

plant of a said company associated with a said asset;

equipment of a said company associated with a said asset;

goodwill of a said company associated with a said asset;

replacement value of assets of a said company associated with a said asset;

liquidation value of assets of a said company associated with a said asset;

liabilities of a said company associated with a said asset;

long term liabilities of a said company associated with a said asset;

short term liabilities of a said company associated with a said asset;

net worth of a said company associated with a said asset;

research and development expense of a said company associated with a said asset;

accounts receivable of a said company associated with a said asset;

accounts payable of a said company associated with a said asset;

cost of goods sold (CGS) of a said company associated with a said asset;

debt ratio of a said company associated with a said asset;

budget of a said company associated with a said asset;

capital budget of a said company associated with a said asset;

cash budget of a said company associated with a said asset;

direct labor budget of a said company associated with a said asset;

factory overhead budget of a said company associated with a said asset;
operating budget of a said company associated with a said asset;
sales budget of a said company associated with a said asset;
inventory method of a said company associated with a said asset;
type of stock offered of a said company associated with a said asset;
liquidity of a said company associated with a said asset;
book income of a said company associated with a said asset;
tax income of a said company associated with a said asset;
capitalization of earnings of a said company associated with a said asset;
capitalization of goodwill of a said company associated with a said asset;
capitalization of interest of a said company associated with a said asset;
capitalization of revenue of a said company associated with a said asset;
capital spending of a said company associated with a said asset;
cash of a said company associated with a said asset;
compensation of a said company associated with a said asset;
employee turnover of a said company associated with a said asset;
overhead costs of a said company associated with a said asset;
credit rating of a said company associated with a said asset;
growth rate of a said company associated with a said asset;
tax rate of a said company associated with a said asset;
liquidation value of entity of a said company associated with a said asset;
capitalization of cash of a said company associated with a said asset;
capitalization of earnings of a said company associated with a said asset;
capitalization of revenue of a said company associated with a said asset;
or value of expected measure of scale of a said entity associated with a said asset.

16. The computer implemented method according to claim 1, wherein said at least one objective measure of scale (O) comprises a ratio of any combination of objective measures of scale (O) relating to one or more of said assets (A) and the ratio is not based on any one of: weighting said one or more assets based on market capitalization; equal weighting; or weighting in proportion to the market price of said one or more assets.

17. The computer implemented method according to claim 16, wherein said ratio of any combination of said objective measures of scale comprises at least one of:
current ratio,
debt ratio,
overhead expense as a percent of sales, or
debt service burden ratio.

18. The computer implemented method according to claim 1, wherein said at least one objective measure of scale (O) comprises said demographic measure (DM) of said company (C) of said asset (A), and wherein said demographic measure (DM) comprises at least one of a financial attribute, an accounting data attribute, a non-financial attribute, a non-accounting data attribute.

19. The computer implemented method according to claim 1, wherein said measure of size comprises a demographic measure comprising any accounting data appearing in an annual report of a said company (C).

20. The computer implemented method according to claim 1, wherein said demographic measure comprises at least one of:
a financial metric;
a non-financial metric;
a non-market related metric;
a number of employees;
a floor space; or
an office space.

21. The method according to claim 1, wherein said (g) comprises weighting based on said at least one objective measure of scale (O), wherein said at least one objective measure of scale (O) comprises an economic indicator (EI).

22. The computer implemented method according to claim 1, wherein said at least one objective measure of scale (O) comprises a measure tied to a particular geography (G) associated with at least one of the assets (A) or the company (C).

23. The computer implemented method of claim 1, wherein the method comprises constructing a portfolio of assets (PA) based upon the index of assets (I).

24. The computer implemented method of claim 23, wherein the portfolio of assets (PA) comprises at least one of:
a fund (F);
a mutual fund (MF);
a fund of funds (FF);
an asset (A) account;
an exchange traded fund (ETF);
a separate account;
a pooled trust; or
a limited partnership.

25. The computer implemented method according to claim 23, comprising: selecting the portfolio of assets (PA) for trading according to the index of assets (I); and trading one or more of said assets (A) comprising said portfolio of assets (PA) based on said method of constructing an index of assets (I).

26. The computer implemented method according to claim 25, wherein said trading comprises: rebalancing the portfolio of assets (PA) based on the index of assets (I).

27. The computer implemented method according to claim 26, wherein said rebalancing is performed on a periodic basis.

28. The computer implemented method according to claim 26, wherein said rebalancing is based upon the constituent assets (IA) reaching a threshold value.

29. The computer implemented method according to claim 25, further comprising: applying one or more rules associated with the index of assets (I).

30. The computer implemented method according to claim 1, wherein the method of constructing the non-capitalization weighted index (I) is used for at least one of: investment management; or investment portfolio benchmarking.

31. The computer implemented method of claim 1, wherein the method further comprises an enhanced index (EI) investing method, comprising: constructing a portfolio of assets in a fashion in which at least one of: holdings; performance; or characteristics, are substantially similar to the index of assets (I).

32. The computer implemented method according to claim 1, wherein said method further comprises: gathering data about the plurality of assets (A) by an index (I) construction manager device comprising computerized databases.

33. The computer implemented method according to claim 1, wherein said at least one objective measure of scale (O) comprises at least one of a financial metric, or a non-financial metric.

* * * * *

UNITED STATES PATENT AND TRADEMARK OFFICE
CERTIFICATE OF CORRECTION

PATENT NO. : 7,620,577 B2
APPLICATION NO. : 11/196509
DATED : November 17, 2009
INVENTOR(S) : Arnott et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Twenty-sixth Day of October, 2010

David J. Kappos
*Director of the United States Patent and Trademark Office*